United States Patent [19]

Anderson et al.

[11] Patent Number: 5,737,394
[45] Date of Patent: Apr. 7, 1998

[54] PORTABLE TELEPHONE APPARATUS HAVING A PLURALITY OF SELECTABLE FUNCTIONS ACTIVATED BY THE USE OF DEDICATED AND/OR SOFT KEYS

[75] Inventors: Geoffrey T. Anderson, San Diego, Calif.; Sophie Klym, Lincoln Park, N.J.; Andrew Todd Zidel, Hawthorne, N.J.; Masaaki Akahane, Mahwah, N.J.; Eduardo Sciammarella, Hoboken, N.J.

[73] Assignees: Sony Corporation, Tokyo, Japan; Sony Electronics, Park Ridge, N.J.

[21] Appl. No.: 597,292

[22] Filed: Feb. 6, 1996

[51] Int. Cl.⁶ .......................... H04M 1/56; H04M 11/08
[52] U.S. Cl. .................. 379/88; 379/93.17; 379/396; 379/354; 455/412
[58] Field of Search ............... 379/89, 88, 59, 379/96, 110, 354, 396, 57, 67, 93.17, 93.18, 110.01, 142; 455/412, 426, 413

[56] References Cited

U.S. PATENT DOCUMENTS

| | | | |
|---|---|---|---|
| 5,425,077 | 6/1995 | Tsoi | 379/58 |
| 5,463,676 | 10/1995 | Ohsawa | 379/67 |
| 5,479,476 | 12/1995 | Finke-Anlauff | 379/58 |
| 5,483,577 | 1/1996 | Gulick | 379/67 |
| 5,487,104 | 1/1996 | Baals et al. | 379/96 |
| 5,526,407 | 6/1996 | Russell et al. | 379/89 |
| 5,557,659 | 9/1996 | Hlyde-Thomson | 379/88 |
| 5,568,536 | 10/1996 | Tiller et al. | 379/58 |
| 5,568,540 | 10/1996 | Greco et al. | 379/89 |
| 5,581,593 | 12/1996 | Engelke et al. | 379/52 |

OTHER PUBLICATIONS

"Displayphone: Telephone and Terminal Combine in a Compact Desk-Top Unit", Rod Adkins et al., *Telesis* (Canada), 1982-four, pp. 2-7.

"Smart Phones", Christopher O'Malley, *Popular Science*, Jan. 1992, pp. 70-73 & 94.

"The Future is Now", *Popular Science*, Jan. 1995, pp. 68-73, 81 & 82.

*Primary Examiner*—Thomas W. Brown
*Attorney, Agent, or Firm*—William S. Frommer; Alvin Sinderbrand

[57] ABSTRACT

A telephone apparatus having a plurality of dedicated keys, a plurality of changeable keys each having at least one respective dedicated function associated therewith, and a display for displaying a plurality of lines of data. The telephone apparatus is adapted to perform a plurality of main functions including so-called menu, message, pad and book functions. Each of such main functions may be directly accessed by depressing only one of the keys. Further, the telephone apparatus enables messages, including voicemail and text data messages, to be received and stored therein. Messages or responses to received messages may be produced and transmitted from the telephone apparatus.

26 Claims, 15 Drawing Sheets

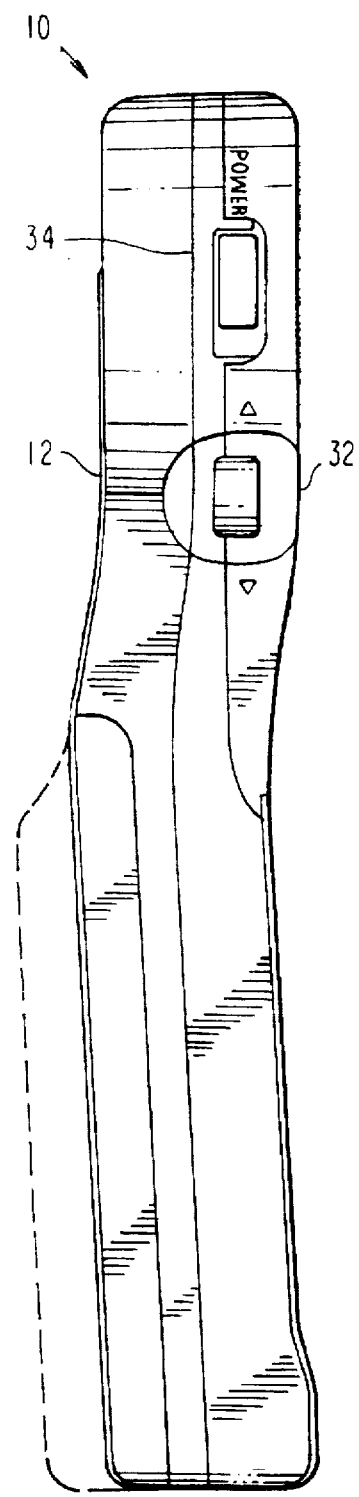
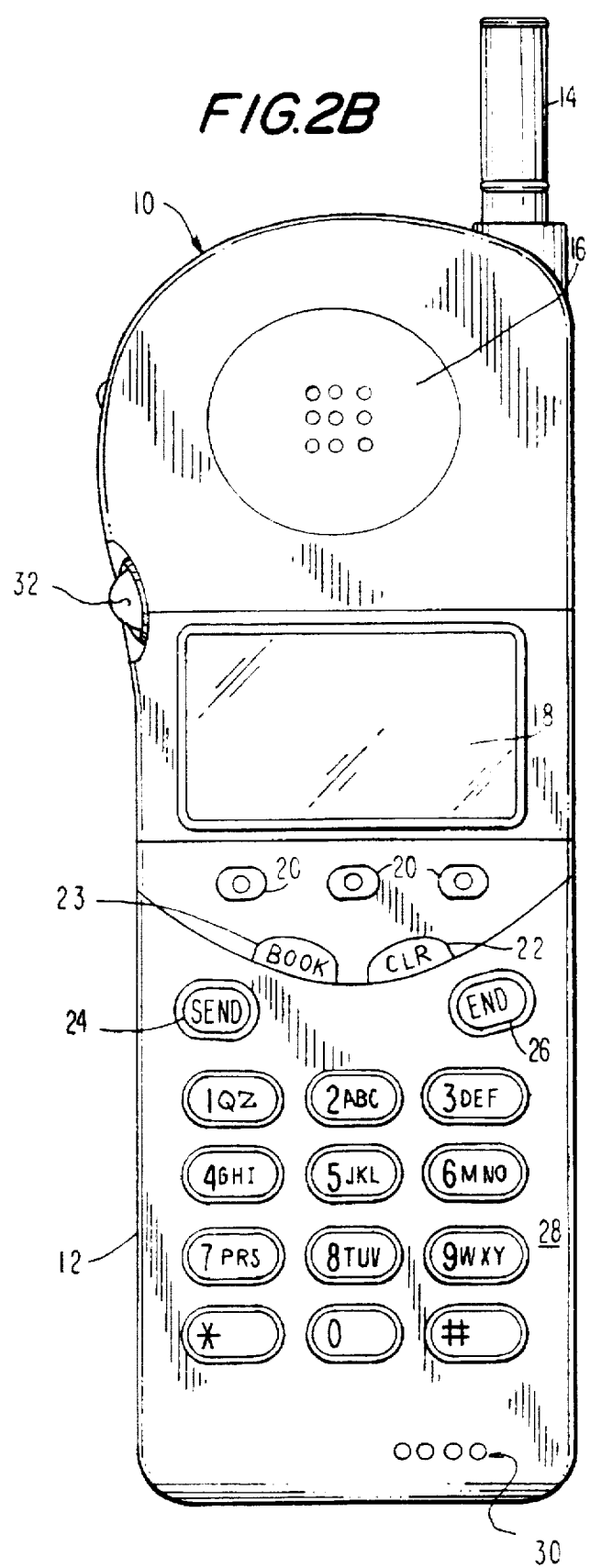

- TO 'PAD' FROM STAND-BY MODE
- ACCESSING THE 'PAD' FROM THE STAND-BY MODE, BRINGS YOU TO THE MOST RECENT ENTRY IN THE 'PAD'

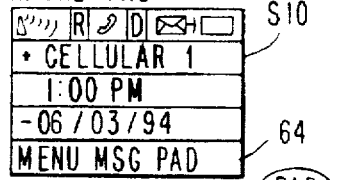

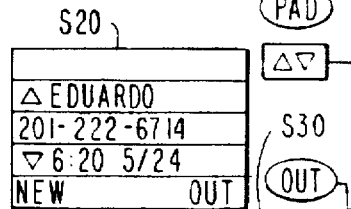

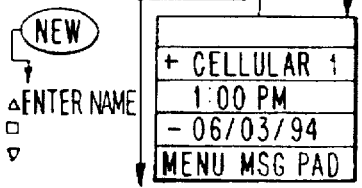

- BY PRESSING THE BOOK-'HARD' BUTTON WHEN IN THE 'PAD' THE USER CAN MOVE THE 'PAD' 'MEMORY PAGE' INTO THE 'BOOK'

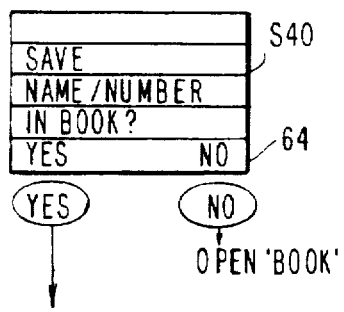

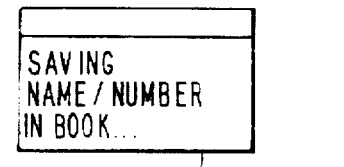

FIG. 7

- TO REVIEW ENTRIES IN THE 'PAD' USE THE 'SCROLL' BUTTON

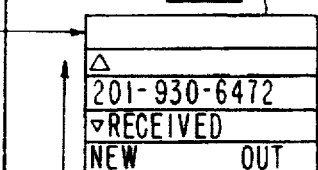

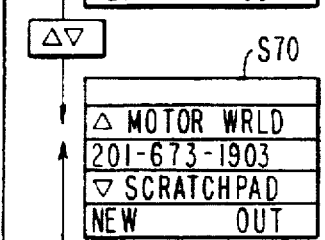

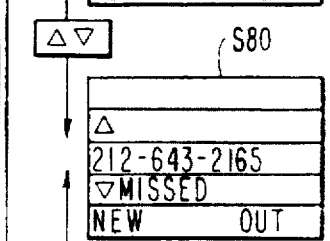

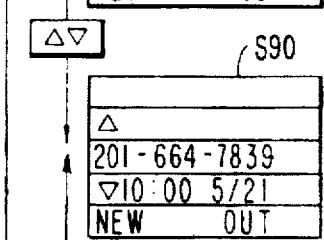

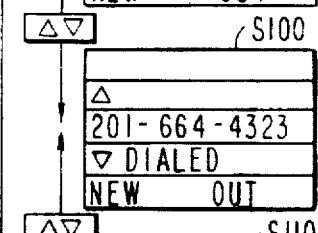

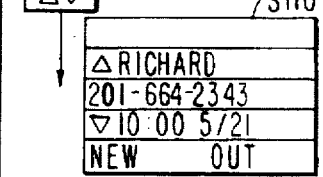

- THE LAST LINE OF EACH 'PAD' 'MEMORY PAGE' WILL ALTERNATE EVERY 1-1.5 SECONDS BETWEEN THE TIME DAY STAMP AND WHETHER IT WAS DIALED, RECEIVED, MISSED, OR SCRATCHPAD

- TO 'PAD' FROM CONVERSATION MODE
- ACCESSING THE 'PAD' FROM THE CONVERSATION MODE OPENS A NEW 'MEMORY PAGE', WHEN THE 'MEMORY PAGE' IS COMPLETED, AND THE USER PRESSES THE OK-'SOFT' BUTTON, THE OLDEST SCRATCHPAD-'MEMORY PAGE' IS DELETED.

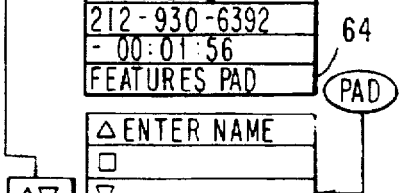

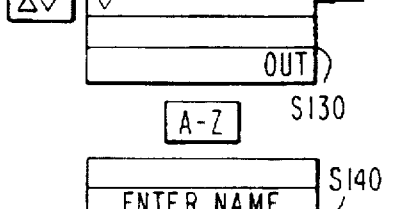

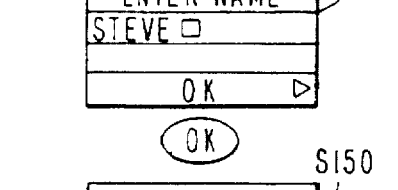

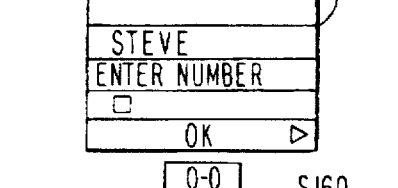

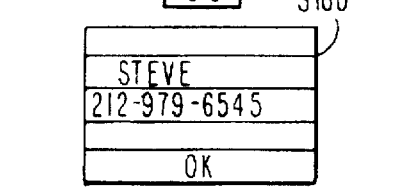

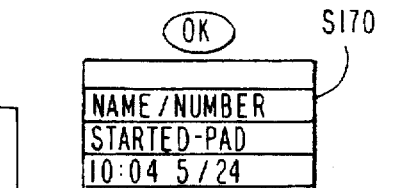

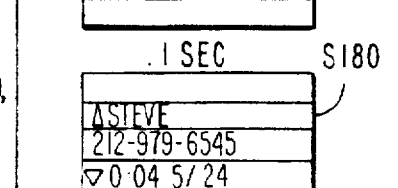

5,737,394

PORTABLE TELEPHONE APPARATUS HAVING A PLURALITY OF SELECTABLE FUNCTIONS ACTIVATED BY THE USE OF DEDICATED AND/OR SOFT KEYS

BACKGROUND OF THE INVENTION

The present invention relates to a telephone apparatus and, more particularly, to such telephone apparatus having a plurality of dedicated and changeable keys which enables an operator to readily select a desired function.

Typically, portable telephones, such as cordless telephones, cellular telephones and the like, include a multiplicity of keys or buttons. Such keys may include 10 alpha-numeric keys, which when activated provide an indication of a desired number and/or letter. As is to be appreciated, these keys may be utilized to call a desired telephone number or to provide a specific signal such as in response to a inquiry or question. In addition to the alpha-numeric keys, these portable telephones may provide one or more functions. For example, the telephone may have a so-called "menu" function which identifies or list various other functions or features. In addition to identifying such features, the menu may be utilized to review or change the settings or parameters associated with these features and to provide access to desired one(s) of these features.

Two functions which may be accessed by way of the menu include a so-called "book" and "pad" functions. The book may be used to store information, such as, telephone numbers, and to provide such stored information upon request. The pad may be used to store information, such as, the numbers of the dialed telephone calls and the received telephone calls.

Therefore, an operator may only access the book or pad functions by use of the menu. Accordingly, as is to be appreciated, this indirect access to the book and pad functions is cumbersome and lengthy. Further, such indirect access may be confusing and, as a result, relatively difficult to use. That is, to gain access to the book or pad, after gaining access to the menu, the operator may need to depress or activate a number of keys which may not be readily apparent. Accordingly, the operator may be required to either memorize the correct selection of keys or constantly refer to an instruction manual.

Furthermore, such portable telephones may provide other features. However, these other features often require depressing or activating keys which may not otherwise be readily apparent. For example, these portable telephones may provide a feature which allows the operator to answer a second call while engaged with a first call. However, to answer such second call, the operator may be required to depress or activate a so-called "send" key. As is to be appreciated, it would not be readily apparent to most operators to depress a send key in order to receive a second call while the operator is engaged with a first call. Accordingly, as with the book and pad functions, the operator may be required to either memorize the correct selection of keys for using these other features or constantly refer to an instruction manual.

Thus, although the above-described portable telephones may provide a plurality of functions or features, to activate these functions or features often requires depressing a selection of keys which may not be readily apparent to the operator. As such, to use these telephones, and all of the functions or features they provide, normally requires the operator to memorize the selection of keys for each function or feature or to constantly refer to an instruction manual.

OBJECTS AND SUMMARY OF THE INVENTION

An object of the present invention is to provide a telephone apparatus which is relatively easy to operate.

More specifically, it is an object of the present invention to provide a telephone apparatus having a plurality of main functions, including a menu function, with a plurality of features associated therewith which are relatively easy to access and activate by an operator.

Another object of the present invention is to provide a telephone apparatus as aforesaid wherein the main functions and the associated features are readily available when an operator may need them.

A further object of the present invention is to provide a telephone apparatus as aforesaid wherein each of the main functions is directly accessible without first accessing any of the other main functions such as the menu function.

A still further object of the present invention is to provide a telephone apparatus as aforesaid which includes a plurality of changeable or soft keys having functions or features associated therewith which change in accordance with a selected mode (such as a stand-by mode and a conversation mode), function or feature.

Yet another object of the present invention is to provide a telephone apparatus as aforesaid wherein one of the main functions includes a so-called "message" function wherein voice and text messages may be received and stored within the telephone apparatus for later retrieval by the operator and wherein the operator may transmit a message, such as a reply to a received message, to a desired person.

In accordance with an aspect of the present invention, a telephone apparatus is provided which comprises a plurality of keys; a device for performing a plurality of main functions including a menu function wherein available features of the telephone apparatus are reviewed and parameters thereof changed, a message function in which messages are received and transmitted from and to a person, a pad function in which telephone numbers that have been dialed, received and missed by the telephone apparatus are reviewed, and a book function wherein names and corresponding telephone numbers are stored and retrieved from storage; and a device for directly accessing each of such main functions by depressing only a respective one of the keys.

In accordance with another aspect of the present invention, a telephone apparatus adapted for communicating between a user and at least one person is provided. The apparatus comprises a plurality of dedicated keys each having at least one respective dedicated function associated therewith, a device for performing a plurality of operational functions including a message function in which text-data messages are received and transmitted from and to a person, and at least one changeable key each having at least one respective changeable function associated therewith. The function of each changeable key is changed in response to the operational function currently being performed. The apparatus further comprises a display for displaying a plurality of lines of digital data including a received text-data message and a transmitted text-data message.

Other objects, features and advantages according to the present invention will become apparent from the following detailed description of the illustrated embodiments when read in conjunction with the accompanying drawings in which corresponding components are identified by the same reference numerals.

BRIEF DESCRIPTION OF THE DRAWINGS

FIGS. 2A and 2B are side and front views, respectively, of a telephone apparatus according to an embodiment of the present invention;

FIG. 7 is a diagram to which reference will be made in explaining screens which may be displayed during operations in the pad function;

DESCRIPTION OF THE PREFERRED EMBODIMENTS

Figure 1:
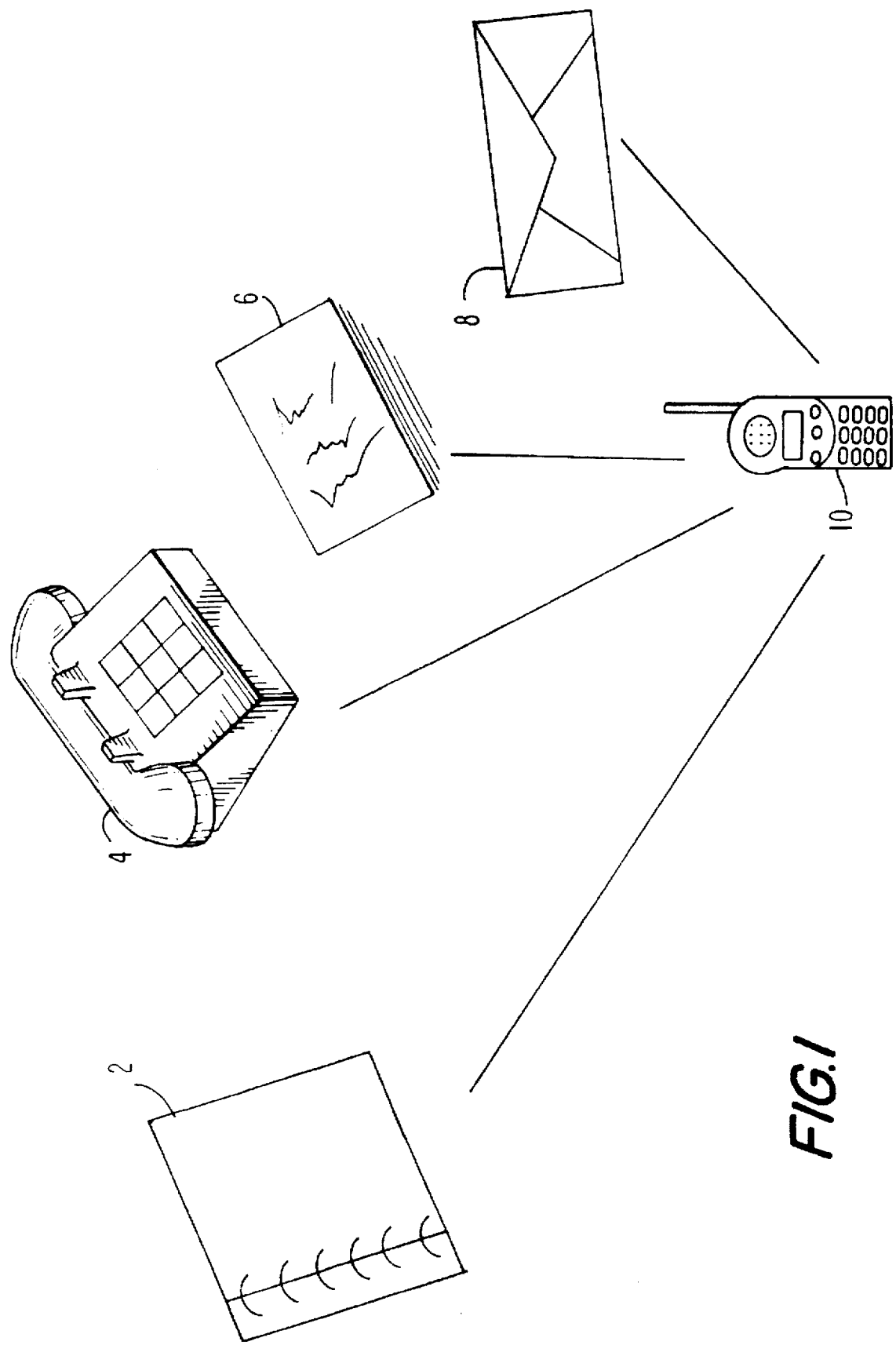
FIG. 1 is a diagram to which reference will be made in explaining the present invention.

A telephone apparatus 10 according to an embodiment of the present invention includes a plurality of main functions. As shown in FIG. 1, such main functions may include a so-called "book" function 2, a menu function 4, a so-called "pad" function 6, and a so-called "message" function 8. As hereinafter more fully described, each of these main functions is arranged with equal priority. In other words, when available, any of these main functions may be directly accessed or activated without having to first access (or go through) another of the main functions (such as the menu function) or any other function. For example, during a stand-by mode, all four of the main functions (i.e., the book, menu, pad and message functions) may be directly accessed by an operator by depressing a respective button or key on the telephone apparatus 10. As a result, in this situation, the operator may gain access to a desired one of the main functions directly by depressing or activating a respective key on the telephone apparatus 10.

More detailed views of the telephone apparatus 10 are illustrated in FIGS. 2A and 2B. As shown therein, the telephone apparatus 10 generally includes a housing 12, an antenna 14, a speaker 16, a display 18, a plurality of changeable keys 20, a clear (CLR) key 22, a book key 23, a send key 24, an end key 26, a plurality of keys 28, a microphone 30, a scroll button 32, and a power key 34.

The housing 12 is adapted to hold or retain all of the parts or elements of the telephone apparatus 10 including the antenna 14, speaker 16, display 18, soft keys 20, hard keys 22, 23, 24 and 26, keys 30, microphone 30, scroll button 32 and power key 34. The housing 12 may be constructed of two or more portions, in which each portion may be formed from a plastic-type material. Such portions are coupled together by the use of adhesive, screws, or other types of fasteners in a well known manner.

The display 18 is preferably a liquid crystal display LCD) which is adapted to display a plurality of lines of information. That is, the LCD display 18 may display five lines of information, in which the top line displays one or more icons which provide respective information to the operator, the middle three lines display dynamically changing information, and the last line displays indications of the functions associated with the soft keys 20.

Figure 4:
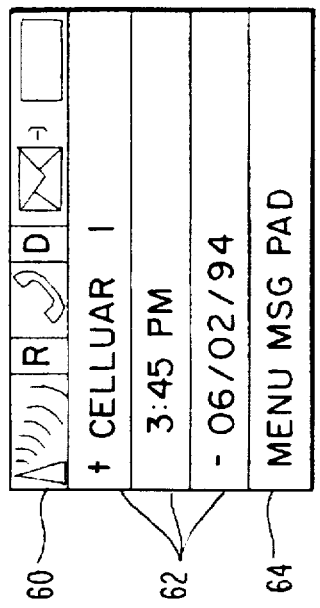
FIG. 4 is a diagram illustrating an example of a screen which may be provided by a display of the telephone apparatus of FIGS. 2A and 2B.
Figure 5:
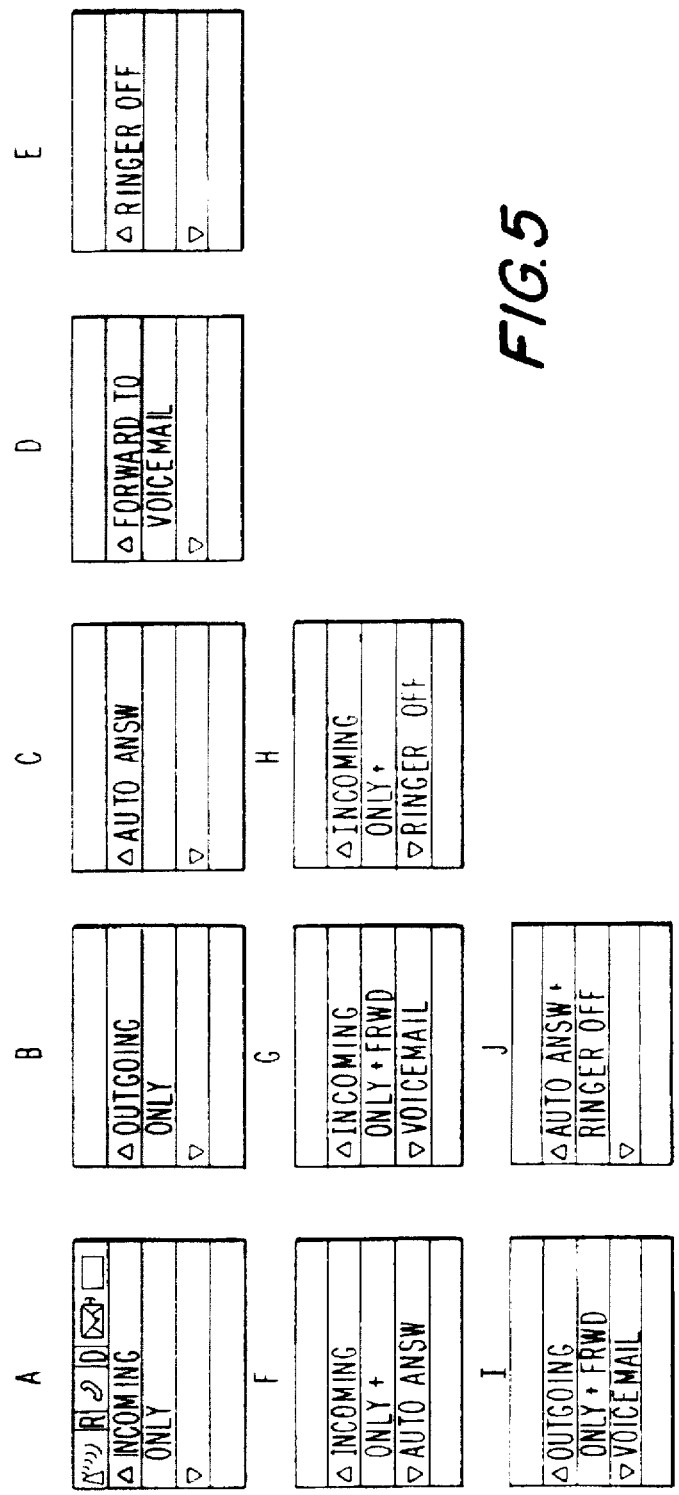
FIGS. 5A–J are diagrams of wake-up/status screens.

FIG. 4 illustrates an example of a display provided by the LCD display 18. As shown therein, a top line 60 displays a plurality of icons (in particular, six icons). The left-most icon is a signal strength icon, which may be referred to as a RSSI icon. The signal strength icon appears when the telephone apparatus 10 is on or activated and is adapted to provide the operator with an indication of the signal strength. That is, the signal strength icon may include from one to five semi-circular bands or arcs, in which the number of such arcs provides an indication of the signal strength. The greater the number of arcs, the greater the signal strength. For example, five arcs indicates a relatively strong signal, whereas one arc indicates a relatively weak signal.

The icon adjacent to the signal strength icon is a roam icon which appears when the telephone apparatus 10 is in use and is registered on a system other than the operator's home system. The icon to the right of the roam icon is a phone or in-use icon which appears whenever the telephone apparatus 10 is engaged in an active call. The icon to the right of the in-use icon is a digital mode icon which, when present, indicates that the telephone apparatus 10 is operating on a digital traffic or digital voice channel.

The icon to the right of the digital mode icon is a text/voicemail message waiting icon. The envelope portion of this icon refers to a text message, while the semi-circular arc portions refer to a voicemail message. When the envelope portion of this icon is displayed, it indicates that short message service is available to the operator, as hereinafter more fully described. On the other hand, when the envelope portion is not displayed, it indicates that such short message service is not so available. Further, when the envelope portion is displayed and is blinking, it indicates that a new text message has been received by the telephone apparatus 10 and stored therein as hereinafter more fully described. Furthermore, voicemail message capability is normally available. When the semi-circular arc portions are blinking, it indicates that a new voicemail message has been received by the telephone apparatus 10 and stored therein.

The right-most icon is a battery level icon which appears when the telephone apparatus 10 is in the on state. The battery level icon has a plurality of segments of a battery. That is, the battery level icon may include from one to four segments of a battery, in which the number of such segments provides an indication of the battery level. The greater the number of segments, the greater the battery level. For example, four segments (which represents a complete battery) indicates a relatively high battery level, whereas one segment indicates a relatively low battery level.

The above-described arrangement of icons provides a relatively large distance between three of the anticipated most commonly utilized icons, that is, the battery level icon, the in-use icon and the signal strength icon. As is to be appreciated, such arrangement enables the operator to easily view these three icons. Further, although only one arrangement of icons was described, these icons may be arranged in a number of other acceptable arrangements. For example, the location of any of the signal strength icon, the in-use icon and the battery level icon could be switched with another of these icons. Similarly, the location of any of the roam icon, the text/voicemail icon and the digital mode icon could be switched with another of these icons.

Each of middle lines 62 may display a plurality of characters (such as up to 12 characters). The middle three lines 62 are utilized for dynamically changing information, that is, information which may change during the operation of the telephone apparatus 10. More specifically, these three lines may display names, numbers, an indication of the system or type of system to which the telephone apparatus 10 is registered, time and date information, text messages, menu features and so forth as hereinafter more fully described. For example, the top line of the middle lines 62 may display "CELLULAR 1" which indicates the system to which the telephone apparatus 10 is registered, and the second and third of the middle lines 62 may display the current time and date.

A bottom line 64 of the display of FIG. 4 may display a plurality of characters (such as 12 characters). As previously described, the bottom line is utilized for providing indications of the functions associated with the soft keys 20. To more easily differentiate between the middle three lines 62 and the bottom line 64, the bottom portion of the display 18 (which corresponds to the bottom line 64) may have a color different from that corresponding to the middle lines. For example, such bottom portion may have a pink color transparent ink printed thereon so that the bottom line is displayed with a pink color tint, thereby distinguishing the bottom line from the middle lines 62. As is to be appreciated, a color other than pink may be utilized. Alternatively, another portion or portions of the display 18 may have a pink color (or other color) transparent ink printed thereon. For example, the portion corresponding to the middle lines 62 may have such pink color, whereupon the portion corresponding to the bottom line 64 is clear. As another alternative, two or more portions of the display 18 may each have a respective color associated therewith.

Referring back to FIG. 2B, the telephone apparatus 10 includes a plurality of soft keys 20, such as three soft keys. These soft keys may be utilized to activate functions or operations which are available depending upon the current mode of operation of the telephone apparatus 10. That is, each of the soft keys 20 may activate different functions at different times during the operation of the telephone apparatus 10. To enable a user to identify which function may be activated by each of the soft keys, the bottom line 64 (FIG. 4) displays the currently available functions which may be activated if any of the soft keys are depressed.

As an example, assume that the telephone apparatus 10 is in a stand-by mode. In such mode, the display 18 may provide a display such as that illustrated in FIG. 4. As shown therein, the bottom line 64 indicates "MENU", "MSG" and "PAD" in this order. Such arrangement indicates that the left-most soft key 20 (as viewed in FIG. 2B) corresponds to the "MENU" indication shown on the bottom line 64, the middle soft key corresponds to the "MSG" indication, and the right-most soft key corresponds to the "PAD" indication. Accordingly, during this stand-by mode, if a user wishes to activate the menu function, the user merely depresses the left-most soft key 20. Similarly, if the user wishes to activate either of the message or pad functions, the user merely depresses the appropriate one of the middle or right-most soft key.

Referring back to FIG. 2B, the book key 23 is a dedicated or so-called hard key and is utilized to access the book function. As hereinafter more fully described, such book function enables names and numbers to be stored in a memory of the telephone apparatus and to be retrieved therefrom.

The clear (CLR) key 22 has two functions associated therewith. In the first function, the clear key is utilized to clear entered digits and characters displayed on the display 18. By momentarily depressing the clear key, the last character or digit entered is erased, and by continuously holding down the clear key, the entire entry is erased. In the second function, the clear key is utilized to return the telephone apparatus 10 to the stand-by or conversation mode from any other operations which the telephone apparatus may currently be in, such as the book function. When the clear key is used in this latter manner, all changes and/or selections revert to the previous configuration which the telephone apparatus was in when it left the stand-by or conversation mode. In other words, no such changes and/or selections are saved. As an example, consider the situation in which the user is entering data into a memory of the telephone apparatus 10. If the user momentarily depresses the clear key 22 once, the last entered digit is erased; and if the user continues depressing the clear key, the remaining digits are erased. A subsequent depression of the clear key within a predetermined time period, such as within 2 seconds, causes the telephone apparatus 10 to revert back to the stand-by or conversation mode.

The send key 24 is utilized to initiate a telephone call and to execute a dialing procedure.

The end key 26 is primarily used to terminate an active telephone call. Additionally, the end key may be utilized for paused dialing, for storing paused numbers into a memory page, and for linking existing memory pages as hereinafter more fully described. When a pause is created in the dialing sequence by depressing the end key, the send key 24 may be depressed to resume the sending of DTMF tone signals.

The keys 28 are utilized for entering digits and alpha characters depending upon the current mode of operation of the telephone apparatus 10. That is, the keys 28 will be placed in the appropriate mode, that is, either in an alpha or numeric mode, depending upon the type of data requested by the telephone apparatus. When entering alpha characters, a single depression of a respective one of the keys 28 corresponds to the first letter assigned to that key, a second depression of this key corresponds to the second letter assigned to this key, and so forth. The desired numeric data may be entered by depressing the respective key one more time than the number of letters assigned to the key. For example, depressing the 2ABC key four times would display the number "2". The alpha-numeric assignment to the twelve keys 28 is as follows:

(QZ1), (ABC2), (DEF3),
(GHI4), (JKL5), (MNO6),
(PRS7), (TUV8), (WXY9),
(*()!), (0), (#./:)

Due to a predetermined default parameter, letters are displayed in lower case. If an upper case letter is desired, the respective key is depressed for a predetermined time period, such as for 1 second. Alternatively, the default parameter could be arranged so as to display upper case letters. Further, predetermined letters may be automatically displayed in upper case, such as the first letter of a name or of a new message. Furthermore, when entering data (such as alphanumeric data), two soft keys may be assigned as an arrow left key and an arrow right key. These arrow left and right keys enable the user to move a cursor across digits and/or letters without changing them, thereby facilitating desired correction and editing operations.

The scroll button 32 may be utilized for controlling or performing a plurality of different operations. For example, the scroll button 32 may be used to control the volume of a ringer (not shown) of the telephone apparatus 10 or the volume of the keys 28 when the telephone apparatus 10 is in the stand-by mode, and may be used to control the volume of the speaker 16 when the telephone apparatus is in the conversation mode. Additionally, the scroll button 32 may be used to enable the user to scan and scroll through memory pages of the book and pad, through text messages, and through menu features, as hereinafter more fully described.

The antenna 14 may be a retractable-type antenna or, alternately, may be a fixed length type antenna. The power key 34 is used to control the power on and off so as to activate or de-activate the telephone apparatus 10. The speaker 16 and the microphone 30 are adapted to operate in a well known manner.

Figure 3:
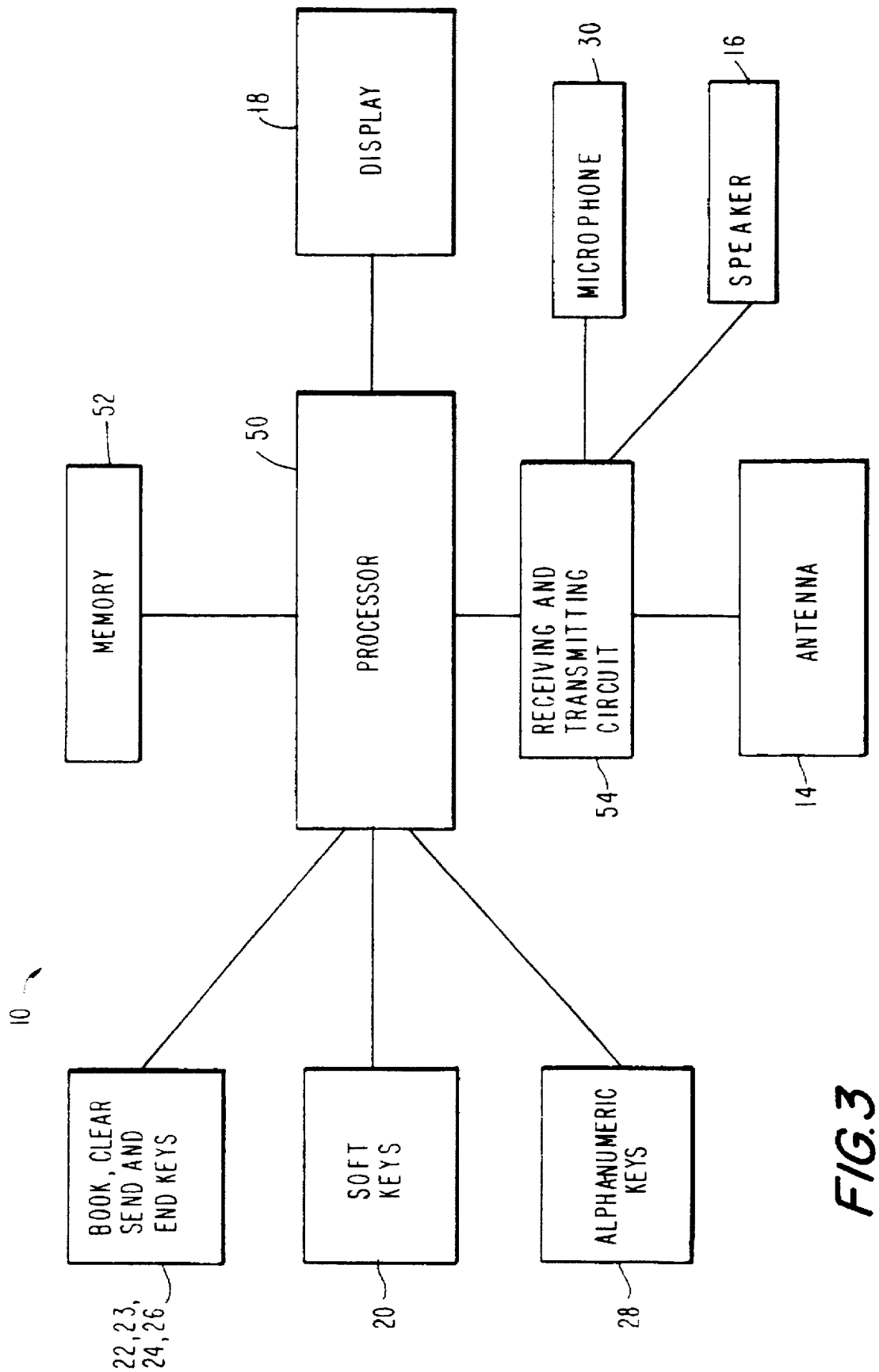
FIG. 3 is a block diagram of the telephone apparatus of FIGS. 2A and 2B.

In addition to the elements described above, the telephone apparatus 10 further includes a processor 50, a memory 52 and a receiving and transmitting circuit 54 as shown in FIG. 3. As shown therein, the processor 50 is coupled to the keys (that is, the soft keys 20, the clear key 22, the book key 23, the send key 24, the end key 26 and the alpha-numeric keys 28), the memory 52, the receiving and transmitting circuit 54 and the display 18. The processor is adapted to receive signals from the receiving and transmitting circuit 54 and/or the keys (that is, signals generated upon depressing one or more of the keys), and to process the received signals in a predetermined manner. During such processing, the processor 50 may request data from the memory 52 which had been previously stored therein, or may cause data to be stored therein. As a result of this processing, the processor 50 may generate and supply a control or data signal to the appropriate device or devices, whereupon the desired operation is performed.

As an example, consider the situation in which the user wishes to store a name and telephone number into the book of the telephone apparatus 10. In this situation, the user may depress the book key 23, the appropriate alpha-numeric keys 28 and one or more soft keys 20 in a manner as hereinafter more fully described. Signals corresponding to the depressed keys are supplied to the processor 50 which, in turn, processes these signals and, in accordance therewith, generates and supplies control or data signals to the display 18 and the memory 52. As a result, the name and telephone number are displayed on the display 18 and stored into a book portion of the memory 52. Further, in this situation, the processor 50 may generate and supply other control signals to the display so as to cause the bottom line 64 (FIG. 4) to display the appropriate functions which may be respectively activated by the soft keys 20, such as those which may be used to store information in the book.

The receiving and transmitting circuit 54 is coupled to the processor 50, the microphone 30, the speaker 16 and the antenna 14 and is adapted to receive signals therefrom. Such received signals may be processed by the circuit 54 in a predetermined manner for supply to the desired device(s). For example, signals from the processor 50 to be transmitted may be supplied to the receiving and transmitting circuit 54 and modulated thereat and thereafter transmitted by way of the antenna 14. Alternatively, such processing may be performed by the processor 50 and supplied directly therefrom to the appropriate device(s), whereupon the circuit 54 may be omitted.

The memory 52 is adapted to receive and store information for later retrieval therefrom. The memory 52 is organized in a plurality of so-called memory pages each having a respective size which may differ from each other. Each memory page may include a name, telephone number, and a numeric tag. The name of each memory page is limited to a predetermined number of characters. For example, each name may be limited to the number of characters available on the top line of the respective memory page, which may be 11 characters. The telephone number may occupy more than one line of the respective memory page. The information pertaining to a memory page may be displayed on one or more screens of the display 18.

The memory 52 may be arranged in an alpha-based manner, that is, the memory pages may be stored in alphabetical order based on the names associated with each of the pages. Access to a desired memory page may be obtained by utilizing a searching technique and the name of the respective memory page. Alternatively, such searching technique may use the corresponding numeric tag of the respective memory page. Additionally, access to a desired memory page may be obtained by scrolling up or down through the memory pages by use of the scroll button 32 (FIGS. 2A and 2B). Furthermore, the contents of each memory page may be scrolled up or down as displayed on the display 18 by use of the scroll button 32.

A number of the memory pages may be dedicated for use with the book and pad functions. That is, in a preferred embodiment, the memory 52 may have 239 memory pages, in which 40 memory pages are dedicated to the pad function and 199 memory pages are dedicated to the book function.

With regard to the 40 memory pages of the pad, 10 such memory pages are for dialed telephone numbers, 10 memory pages are for so-called scratchpad telephone numbers, 10 memory pages are for missed telephone numbers and 10 memory pages are for received telephone numbers. Each telephone number included in the pad memory pages may be tagged or provided with an indication that the respective number is a dialed, scratchpad, missed or received number. Scrolling through the pad provides a listing on the display 18 of the activities of the telephone apparatus 10 as they occurred over time.

With regard to the 199 memory pages of the book, each of the numbers stored on these pages have an alpha address (i.e., an address corresponding to the respective name associated with the page) or, alternatively, may have a numeric tag. Predetermined numbers of the 199 memory pages may be designated as so-called one touch numbers and super speed dialing numbers. For example, any 9 numbers in the book may be one touch numbers and any 89 numbers in the book may be super speed dialing numbers. The 9 one touch numbers may each have an alpha address and a numeric tags from 1–9, and the 89 super speed dial numbers may each have an alpha address and a numeric tag from 10–99.

If desired, access to the memory may be restricted. For example, a restriction or lock may be imposed in which the names and numbers in the book may only be read and cannot be revised. As another example, a password or code may be required to gain any access to the book (including reading and/or writing of entries). These restrictions and passwords may be implemented by use of the menu feature.

Storing a number in the book or pad is relatively simple. For example, the following sequence may be performed to store a number in the book:

the book key 23 (FIG. 2B) is depressed, whereupon a soft key identified as "new" is available;

the "new" soft key is depressed;

the name or initial of the person, company or so forth is entered by using the keys 28;

upon completing the entering of the name or initial, a soft key identified as "OK" is depressed;

the telephone number is entered by use of keys 28; and upon completing the entering of the telephone number, the "OK" soft key is depressed.

If a numeric tag is to be stored, it may be entered after the above last step by use of the keys 28 after which the "OK" soft key is depressed. Use of a numeric tag from 1–9 may identify the respective number as a one touch number, and use of a numeric tag from 10–99 may identify the respective number as a super speed dial number. (That is, a one touch number may be dialed by depressing the desired one of the key pads 28 for a predetermined time period such as 1 second, and super speed dial numbers may be dialed by depressing the appropriate two digits and the send key 24.) Furthermore, the sequence for storing a number into the pad is substantially the same as that for the book except that numeric tags are not utilized.

The numbers stored in the book and/or pad may be easily reviewed, cleared, linked and edited. That is, by depressing the book key 23 or the pad soft key and then the appropriate one(s) of the keys 28, the soft keys 20 or by scrolling, a user may readily perform any of these operations. In any event, prior to performing any of these operations, a searching operation is performed so as to locate a desired name. In performing such searching operation, the telephone apparatus 10 utilizes an automatic searching operation wherein as the user enters the letters or digits of the desired name or number, the page closest to the letter(s) or digit(s) entered is retrieved. As such, the more letters or digits entered, the more accurate is the search. As is to be appreciated, such searching arrangement may permit a user to enter a lesser number of letters or digits than in the respective name or digit and still obtain an accurate search. Further, searching in the pad feature is accomplished by using the scroll button 32 (FIGS. 2A and 2B).

With regard to the clearing operation for the pad, the pad has an automatic dumping procedure which follows the last in first out rule for the four types of memory pages stored in the pad (i.e., dialed number pages, scratchpad number pages, received number pages and missed number pages). For example, if all 10 pages allocated for the dialed number pages are filled and a new dialed number is stored in the pad, then the first or oldest dialed number is dumped.

The linking feature enables information contained on two or more memory pages to be combined or linked together. For example, suppose it is desired to link two pages from the book. In this example, the book key 23 is depressed, one of the two names or pages is located, the end key 26 is depressed, the other name or page is located, and a soft key identified as "OK" is depressed.

Upon locating a desired memory page, the editing operation may be performed by directing a cursor to the desired position and thereafter performing the desired editing. Movement of the cursor may be controlled by use of the scroll button 32 which moves the cursor to a desired line of the memory page and by use of soft keys identified as left and right arrows which respectively move the cursor in the left and right directions along the respective line.

During normal operation, the telephone apparatus 10 may be in either a stand-by mode or a conversation mode. Each of these modes and the screens which may be displayed on the display 18 (FIG. 2B) during such modes will now be described below.

The telephone apparatus 10 is placed in the stand-by mode when power is applied to the telephone apparatus and none of the features or functions of the telephone apparatus are being utilized. When the telephone apparatus 10 is in the stand-by mode, a stand-by screen may be displayed on the display 18. Such stand-by screen may display an indication of the type of system in which the telephone apparatus 10 is currently registered with, and may also display the current time and date. The stand-by screen may further provide additional information, such as an indication of incoming calls and incoming messages. From the stand-by screen, a user may access the features or functions of the telephone apparatus 10 including the menu, the message, the pad, the book, volume controls for the ringer and the keys, and so forth. An example of a stand-by screen is illustrated in FIG. 4.

Prior to displaying the stand-by screen, a so-called wake-up screen may be displayed on the display 18. Such wake-up screen may appear for a predetermined amount of time, such as 3–4 seconds, after the telephone apparatus 10 receives power. Additionally, after the telephone apparatus 10 has been on for a predetermined amount of time, a status screen may be displayed by an initial depression of the menu soft key. (Accordingly, the status screen may be the first screen displayed when in the menu.) By depressing a soft key identified as "out", such status screen may be removed so as to return to the previous function or screen. Alternately, as in the wake-up screen, the status screen may be removed after a predetermined time, such as 3–4 seconds. The wake-up and status screens provide the user with information pertaining to the settings or configuration of the telephone apparatus 10 which may be crucial to the user's intended operations. For example, the wake-up/status screen may indicate that the ringer of the telephone apparatus 10 is off such that the user may not hear a ringing sound when a call has been received. Examples of wake-up/status screens are illustrated in FIGS. 5A–J.

The telephone apparatus 10 is in the conversation mode whenever the telephone apparatus is being utilized for an active call. When the telephone apparatus 10 is in the conversation mode, the pad soft key and a soft key identified as "features" may be available. Depressing the features soft key provides access to features available in the conversation mode, such as mute, 3-way, the message, the menu and so forth. The mute feature permits a user to mute the microphone 30 (FIG. 2B), the 3-way feature enables a 3-way conference call, and the message feature enables a user to access text messages which may have been previously received and stored within the memory. If an incoming call arrives while the user is engaged in a conversation, the features soft key is changed to a "line 2" soft key which, if depressed, enables the new incoming call to be answered. Similarly, if a message arrives while the user is engaged in a conversation, the features soft key is changed to a "msg" (message) soft key which, if depressed, enables the user to access the received message. Depressing the pad soft key accesses the pad function which will be more fully described hereinafter.

Figure 6:
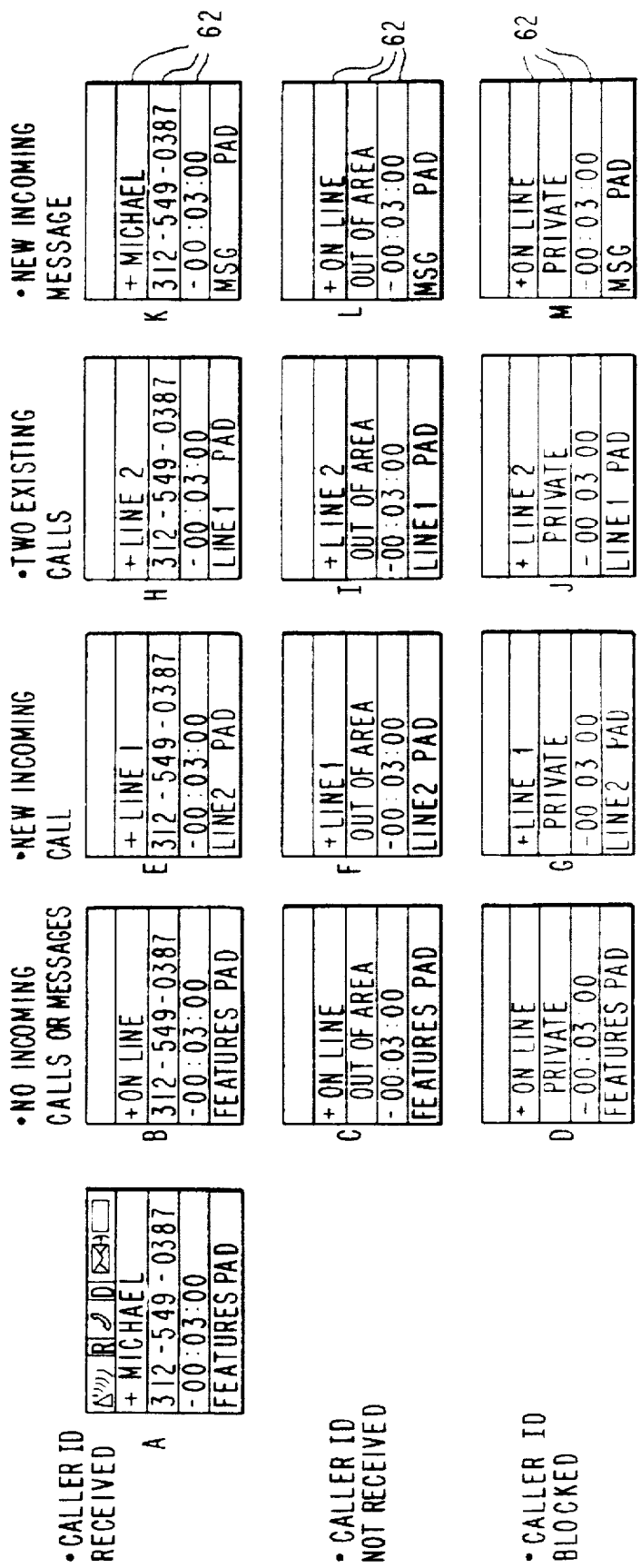
FIGS. 6A–M are diagrams of conversation screens.

A conversation screen may be displayed on the display 18 when the telephone apparatus 10 is in the conversation mode, that is, when an incoming call has been answered or the user has initiated a call. The conversation screen may indicate the person and the telephone number to whom the user is speaking, the length of the conversation and other such information. Examples of the conversation screens are illustrated in FIGS. 6A–M. These examples will now be briefly described. During an outgoing call, the top line of the three middle lines 62 may display the caller's name, as shown in FIG. 6A, if the number dialed matches a number previously stored in the memory of the telephone apparatus 10 along with the corresponding name. A name may be similarly displayed during an incoming call provided caller identification information is received. If no name is available, the top middle line may display "on line" when there is only one call (as shown in FIGS. 6B–D), or the top middle line may display "line 1" (as shown in FIGS. 6E–G) or "line 2" (as shown in FIGS. 6H–J) or some combination thereof during a 3-way call or call waiting. The middle line of the lines 62 may display the number connected to the telephone apparatus 10, as shown in FIGS. 6A, B, E, H and K. In particular, such number is always available during an outgoing call and accordingly is displayed; such number may be displayed during an incoming call if caller identification is received (FIGS. 6A, B, E, H and K) and "out of area" may be displayed if it is not received as shown in FIGS. 6C, F, I and L; and "private" may be displayed if the caller identification is blocked as shown in FIGS. 6D, G, J and M. The bottom line of lines 62 may display the elapsed time of the current call.

The pad, book, message and menu functions along with the screens displayed during these functions will now be more fully described below.

The pad function, as previously described, has memory pages (i.e., dialed, received, missed and scratchpad memory pages) and may be accessed by depressing the soft pad key (which may be the right soft key 20) as displayed in the stand-by and conversation screens. The pad function is substantially similar whether the telephone apparatus 10 is operating in the stand-by or conversation modes. That is, the pad may be used to review numbers which have been dialed, received, missed or entered into the scratchpad or to store numbers into the scratchpad. Such numbers may be displayed in chronological order such that the pad provides an indication of the telephone apparatus's use over time.

Two soft keys may appear when operating in the pad, that is, a "new" soft key and an "out" soft key. Depressing the new soft key may enable a new name and number to be entered into the scratchpad and, if all of the scratchpad pages are full, may cause the oldest (or first in) scratchpad memory page to be dumped. Depressing the out soft key may return the user from the current pad operation to the prior stand-by or conversation screen.

During the pad function, the top line of the middle lines 62 may display the name associated with the respective telephone number, and the middle line of lines 62 may display the respective number. (The display of such name and number with regard to their availability may operate in a similar manner to that previously described with reference to the conversation screens.) The bottom line of lines 62 may alternately display at predetermined time intervals (such as 1–1.5 seconds) an indication of the type of memory page (i.e., dialed, received, missed or scratchpad) and the time it was stored in memory.

When the pad is accessed from the stand-by screen, the most recently entered memory page may be displayed. After which, other memory pages may be displayed by depressing the scroll button 32 up or down. The memory pages may be coupled in a cyclical manner, such that the first page follows the last page entered. When the pad is accessed from the conversation screen, a new memory page may be made available. If, however, a specific page is desired, the user may utilize the scroll button 32 to locate it. Scroll symbols or arrows may be displayed during this time and may disappear when a name is entered.

A memory page may be moved from the pad to the book by depressing the book key 23. Since pages in the book contain names, such memory page will be moved as is to the book if it contains a name. However, if such memory page does not contain a name, then a name is added prior to storing such page in the book.

FIG. 7 illustrates screens which may be displayed during various operations in the pad. Screen S10 illustrates a screen which may be displayed during the stand-by mode. As indicated on the bottom line 64 of the screen S10, the pad function may be activated by depressing the right-most soft key. Upon depressing such soft key, the screen S20 (which may be the most recently entered memory page) may be displayed. As shown therein, the bottom line 64 indicates that the "new" and "out" soft keys are available. Depressing the out soft key may return the user to the stand-by screen S30. Depressing the new soft key may enable a new name and number to be entered into the scratchpad in the manner previously described. From the screen S20, the user may move the memory page into the book by depressing the book key 23, whereupon screen S40 may appear. As shown in the bottom line 64 of the screen S40, soft keys "yes" and "no" are available. Accordingly, if the page is to be saved into the book, then the yes soft key is depressed, whereupon screen S50 may appear. If, however, the page is not to be saved, then the no soft key is depressed.

Returning to screen S20, by depressing the scroll button 32, the user may scroll through the entries in the pad as shown in screens S60, S70, S80, S90, S100 and S110.

Screen S120 illustrates a screen which may be displayed during the conversation mode. As indicated on the bottom line 64 of the screen S120, the pad function may be activated by depressing the right-most soft key. Upon depressing such soft key, the screen S130 may be displayed. The user may either scroll through the pages (screens S60–S110) or may enter new information on a new memory page and depress an "OK" soft key when completed as shown in screens S140, S150, S160, S170 and S180.

The book function, as previously described, may have memory pages (e.g., 199 pages) and may be accessed by depressing the book key 23 (FIG. 2B) in the either the stand-by or conversation modes (or screens). The book function enables names and associated numbers to be stored in memory and enables stored names and numbers to be retrieved.

Several soft keys may be available while operating in the book and, if depressed, may activate or initiate various operations. That is, a "find" soft key may initiate a search for a specific memory page by utilizing either the respective name or numeric tag in the manner previously described. A "#tag" may be used in sequence with the find soft key to find a memory page by using the respective numeric tag. (Using the respective name may be the default finding technique in the book.) A "new" soft key may initiate the process of adding a new memory page, wherein the user is first prompted to enter the name (the key pads 28 may be automatically placed in an alpha-mode) and is next prompted to enter the number (the key pads 28 may be automatically placed in a numeric-mode). After which, the user may enter a numeric tag (such as 1–99 as previously described and/or if available). If such numeric tag is not entered, the user may depress an "OK" soft key. A "fix" soft key may provide another screen having other available features or soft keys, such as a "del" soft key and an "edit" soft key. Depressing the del soft key deletes a memory page and depressing the edit soft key enables a memory page to be edited. An "OK" soft key may be used to confirm the entry of names, numbers and/or numeric tags when creating a new memory page. An "out" soft key may return the display to the prior screen (e.g., the find, new or fix screen) from the current screen (e.g., the del or edit screen).

While operating in the book, the top line of the middle lines 62 may contain a name, the middle line of lines 62 may include the telephone number corresponding to the name, and the bottom line of lines 62 may have a numeric tag.

Thus, operating in the book is relatively simple. That is, an initial depression of the book key 23 may activate or open the book. Thereafter, for example, a find soft key may be depressed so as to initiate a search after which a name may be entered by use of the key pads 28 or a numeric tag is entered; a new soft key may be depressed so as to initiate the process of adding a new memory page after which a name, number and numeric tag may be entered; a fix soft key may be depressed so as to access other functions such as a delete and edit functions; or the scroll button 32 may be utilized to review a memory page or pages. Further, the user may review his/her number from the stand-by or conversation screen by depressing the book key 23 and the scroll button 32.

Figure 8:
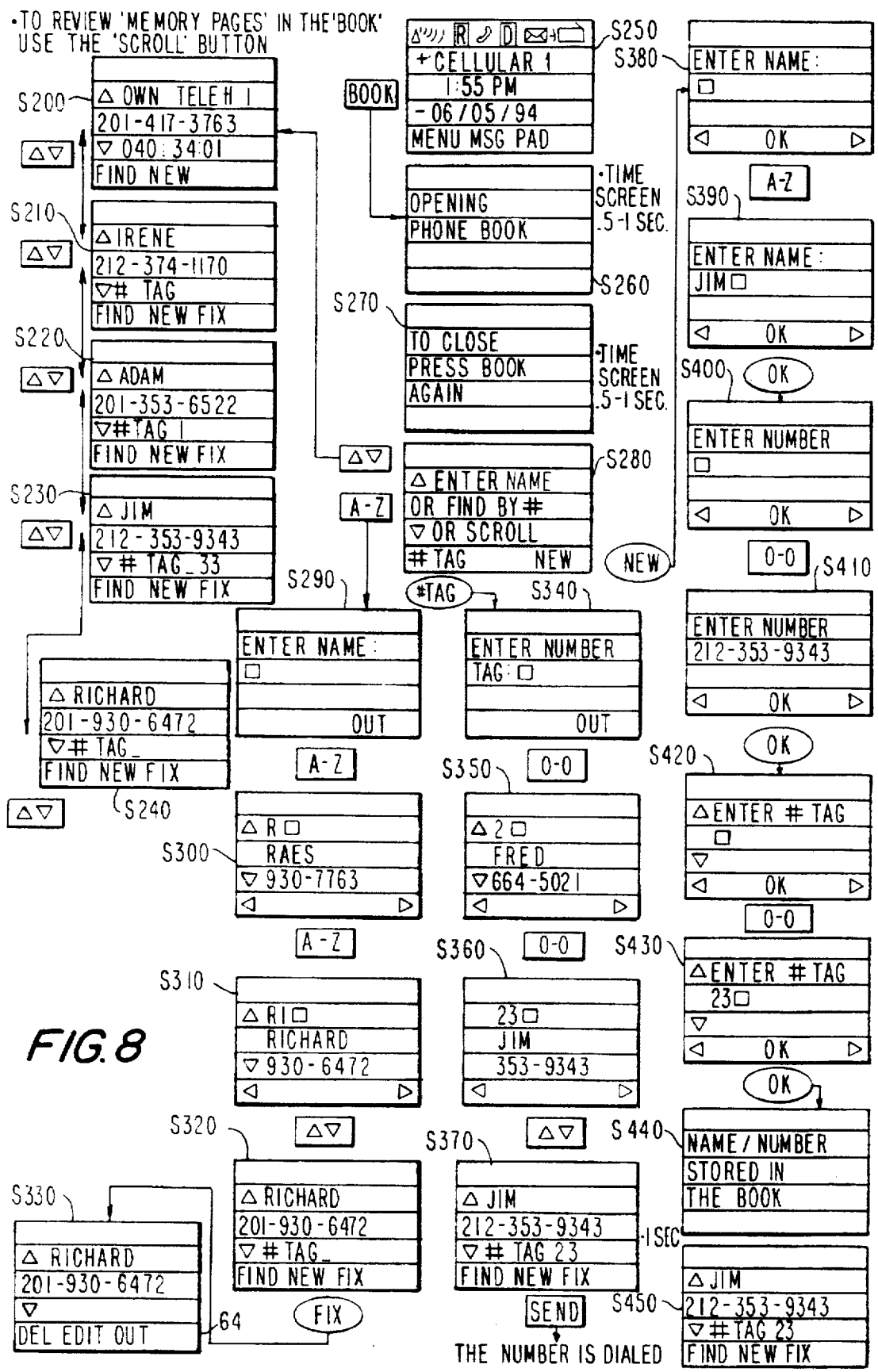
FIG. 8 is a diagram to which reference will be made in explaining screens which may be displayed during operations in the book function.

FIG. 8 illustrates screens which may be displayed during various operations in the book. Screen S250 illustrates a screen which may be displayed during the stand-by mode. Depressing the book key 23 accesses the book function as shown in screens S260 and S270. From screen S280, the memory pages in the book may be reviewed by utilizing the scroll button 32 as shown in screens S200, S210, S220, S230 and S240.

Returning to screen S280, a name search may be performed as shown in screens S290, S300, S310 and S320. (Note in screen S300, the page displayed is that closest to the first letter inputted, that is, "r". After the second letter is entered in screen S310, the correct page is displayed.) If the fix soft key is depressed in screen S320, then the other available functions (i.e., delete and edit) are displayed in the line 64 as shown in screen S330.

Returning to screen S280, a numeric tag search may be performed by depressing the #tag soft key and then the respective tag number as shown in screens S340, S350, S360 and S370. (Note in screen S350, the page displayed is that closest to the first digit inputted, that is, "2". After the second digit is entered in screen S360, the correct page is displayed.) Thereafter, the send key 24 may be depressed so as to dial the number displayed on screen S370.

Returning to screen S280, a new memory page may be added by depressing the new soft key after which the desired name, telephone number and numeric tag are entered as shown in screens S380, S390, S400, S410, S420, S430, S440 and S450. After the correct name, telephone number and numeric tag are entered, the OK soft key is depressed so as to indicate that each has been properly and completely inputted as shown in screens S390, S410 and S430, respectively.

The message function may be accessed by depressing the "msg" soft key. The message function enables messages, such as voicemail or text messages, to be received and stored within the telephone apparatus 10 and enables messages and/or responses to received messages to be transmitted from the telephone apparatus. An indication that a new message has been received may be provided by an audible sound and/or the text/voicemail message waiting icon, as previously described with reference to FIG. 4. For example, the message waiting icon and the msg soft key may blink when a new message has been received. Further, a message waiting indication screen may appear when a new message has been received. For example, such message waiting indication screen may appear during the conversation mode when a new message has been received. In addition to indicating that a new message has been received, such message waiting indication screen may indicate the other information, such as the type of message (e.g., text or voice mail messages) and the quantity of messages. If the user does not attend to the new message within a predetermined time period (such as 3 seconds) after the: message waiting indicating screen is displayed, then the previously displayed screen may be displayed.

Upon depressing the msg soft key, numerous options may be available depending upon the current operating mode, whether new messages have been received, or whether a new message is to be created. For example, if the most recently received messages are new text messages, then two scroll arrows which are blinking and pointing downward may appear on the display 18. On the other hand, if the most recently received messages are voicemail messages, then a "vm" soft key may be blinking. If the msg soft key is depressed when the telephone apparatus 10 is in the stand-by mode, and there are neither new nor old messages, the scroll arrows may point towards each other. If the telephone apparatus 10 is not in the conversation mode, the "new" soft key may be available so as to create a new message for transmission. An "out" soft key may be depressed to return to the prior stand-by or conversation screen.

After reviewing a received message, various options may be available to a user. For example, the user may delete such message or may transmit an answer or response to the received message. If the user decides to answer the received message, an "answ" soft key may be depressed, whereupon a list of responses are displayed on the display 18. Such responses may include a predetermined set of responses which were previously stored in a memory (such as the memory 52) of the telephone apparatus 10. Upon receiving a message, the stored set of responses are supplied to the display 18. Alternatively, the received message may include one or more responses. In either event, the user may scroll through these responses and select an appropriate response. Such response may be edited by depressing the "edit" soft key. The selected or modified response is placed in the middle of the lines 62, whereat an arrow is pointing to the right. Afterwards, an "OK" soft key may be depressed to indicate that the response is acceptable. Such response may thereafter be sent or transmitted. If the response is in reply to a received message, depressing the send key 24 may transmit the response to the party who sent the message. On the other hand, if the message being sent is a new message or is not in response to a received message, then the desired telephone number is provided. Such telephone number may either be entered or retrieved from the pad or the book.

Figure 9A:
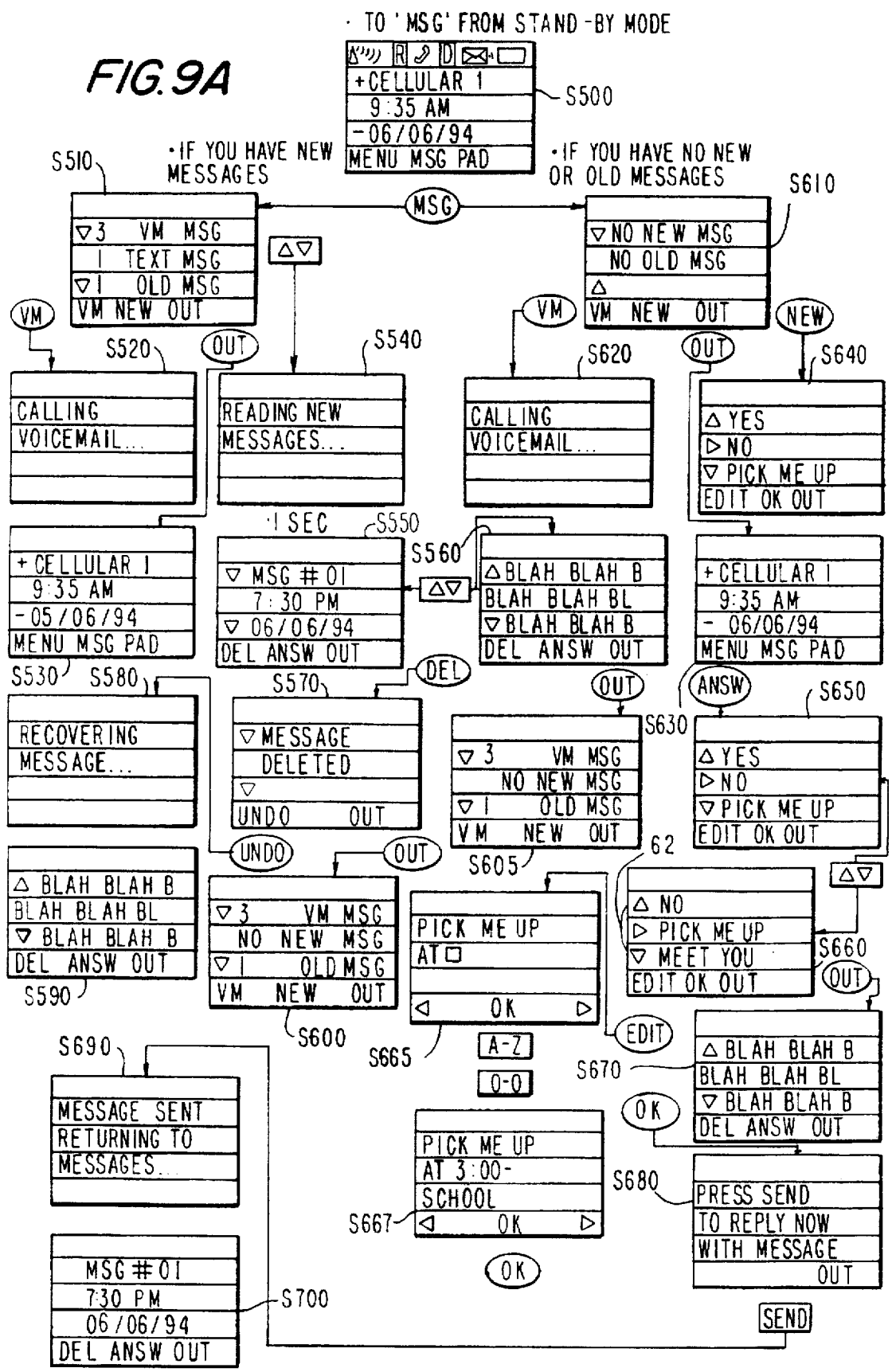
FIGS. 9A and 9B are diagrams to which reference will be made in explaining screens which may be displayed during operations in the message function while the present telephone apparatus is in a stand-by mode and a conversation mode, respectively.
Figure 9B:
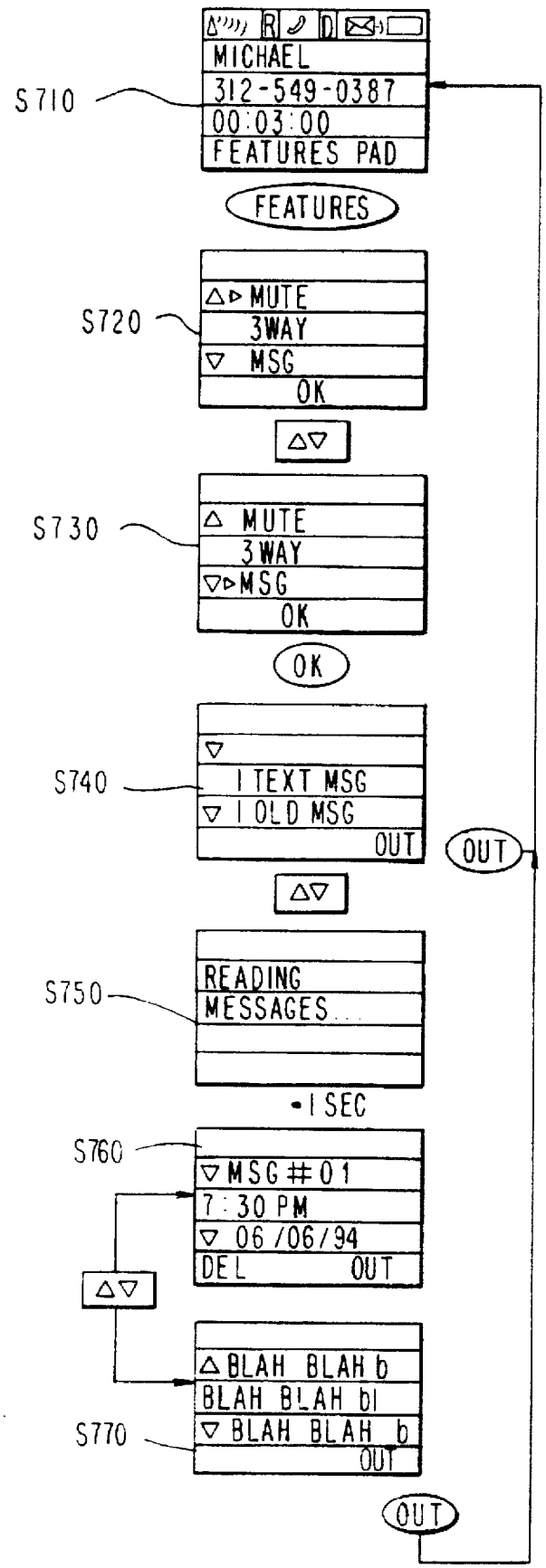
Figure 10A:
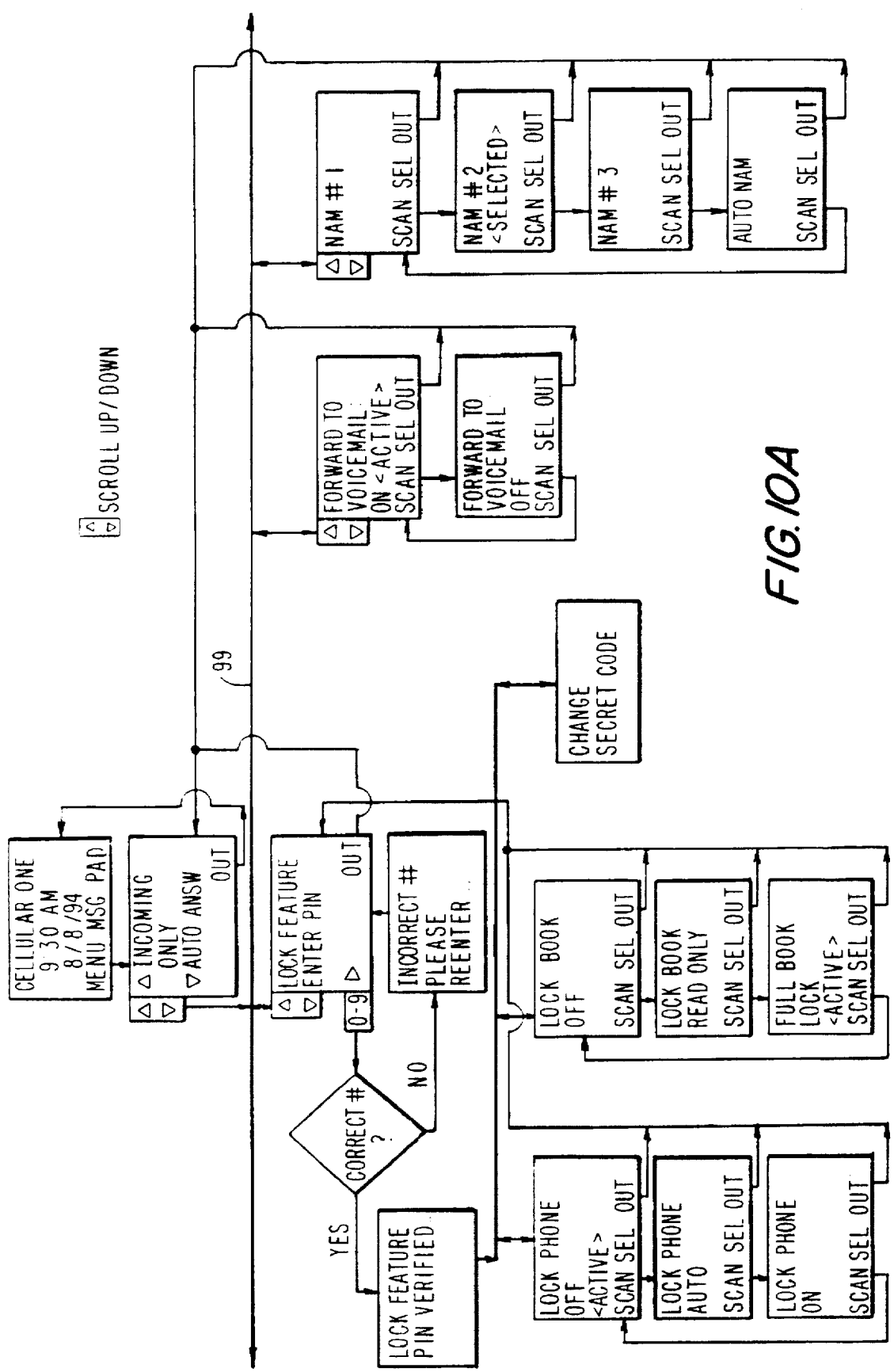
FIGS. 10A–F are diagrams of screens which may be displayed while the present telephone apparatus is operating in the menu function.
Figure 10B:
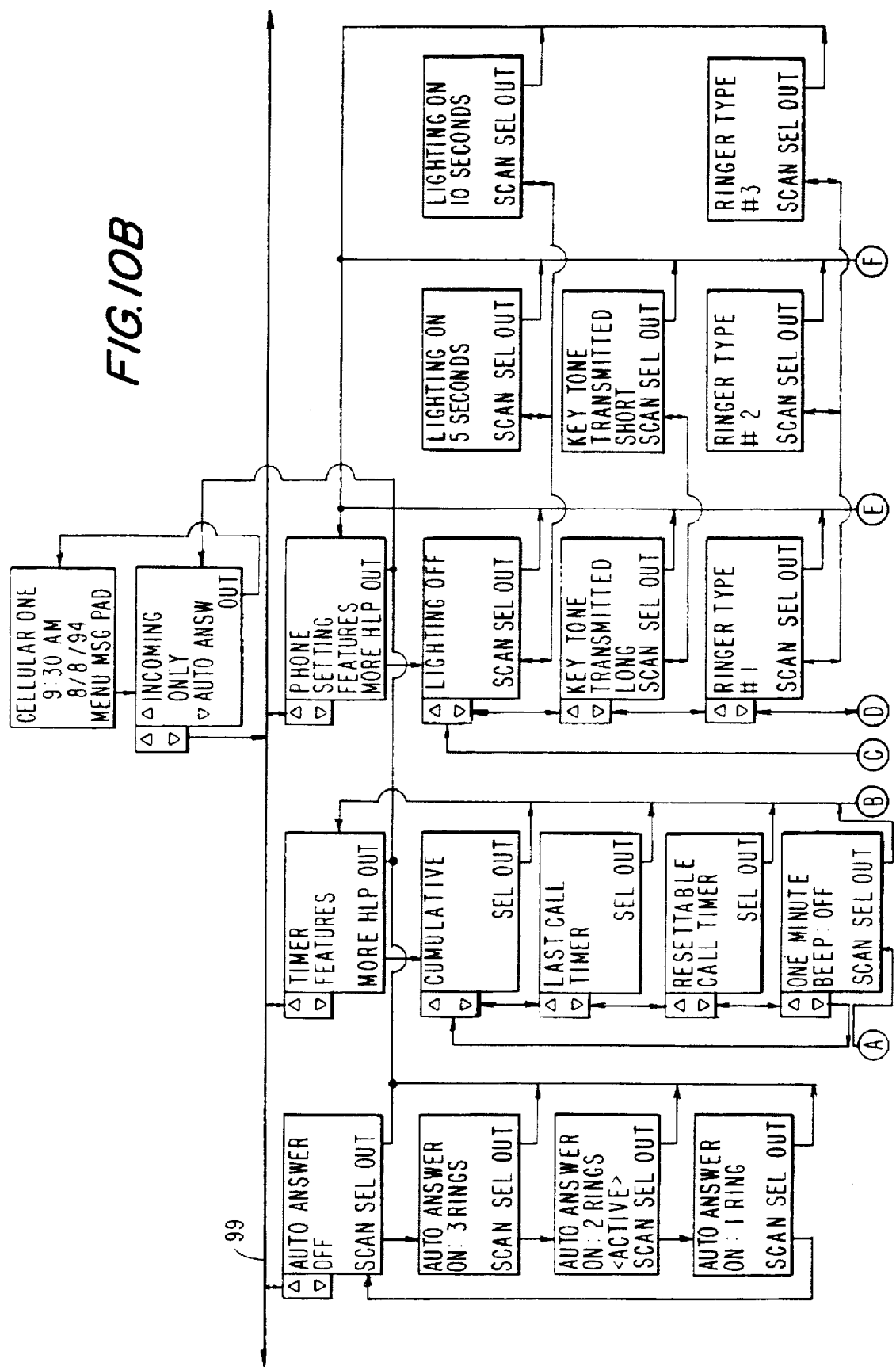
Figure 10C:
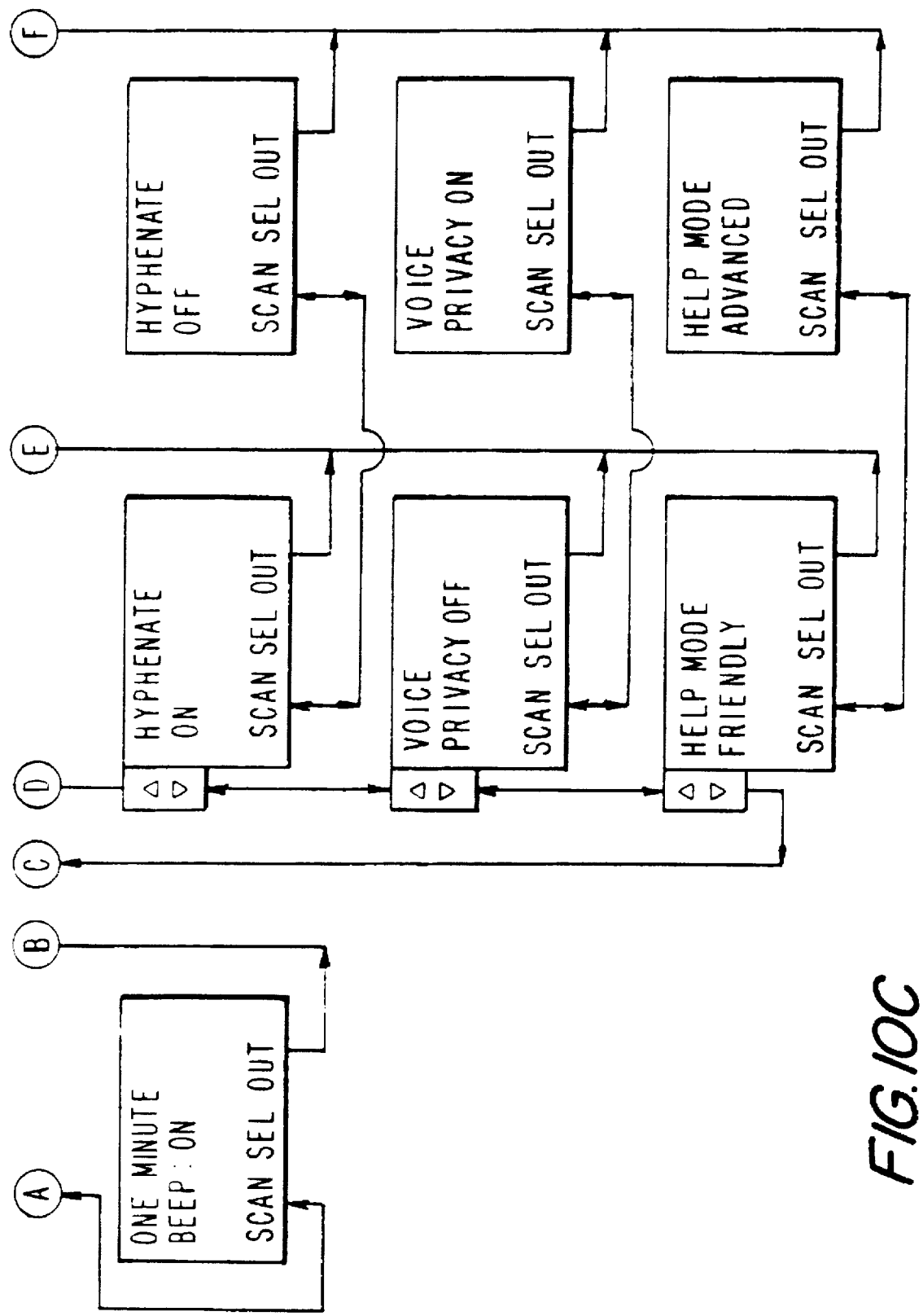
Figure 10D:
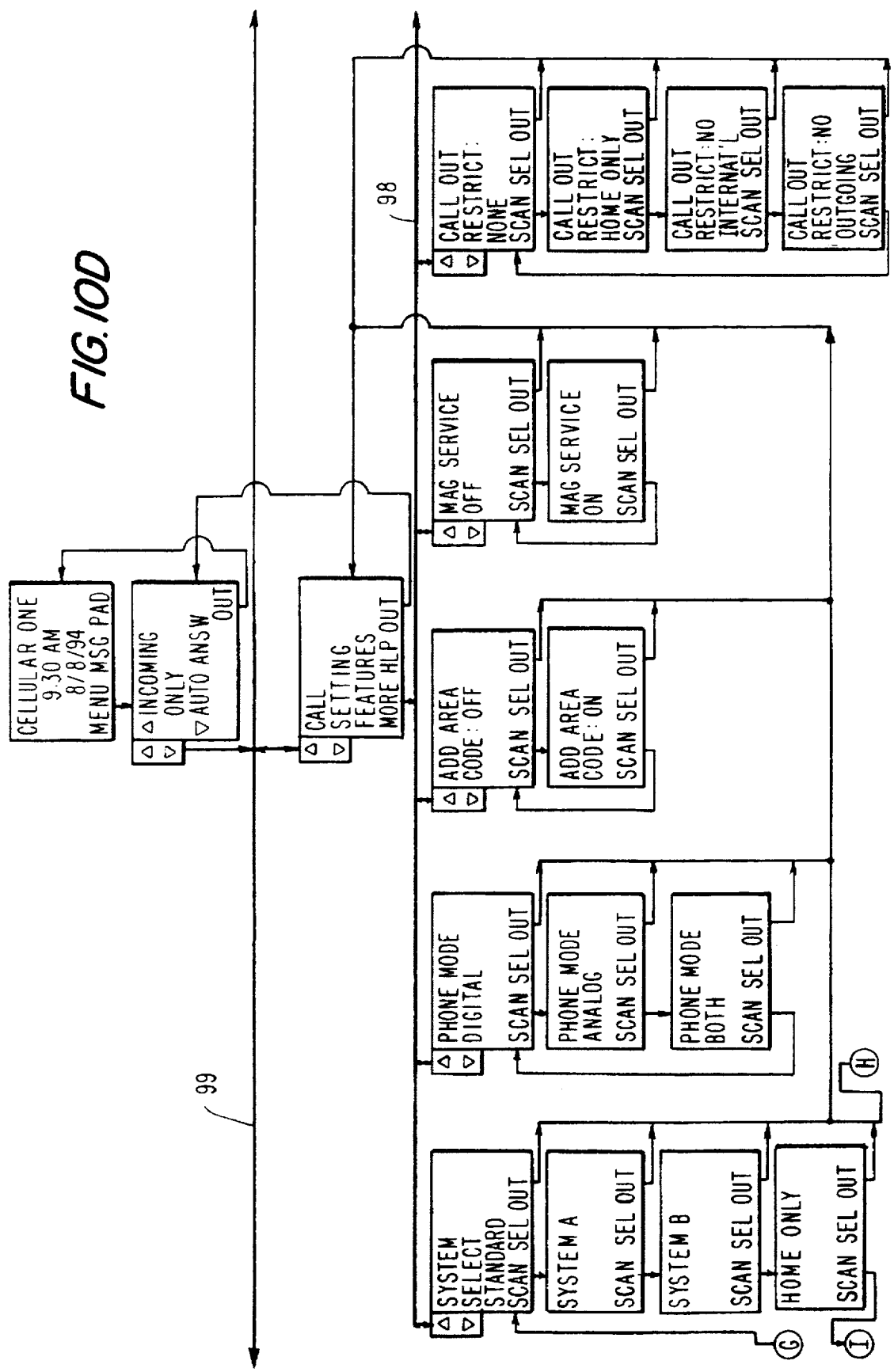
Figure 10E:
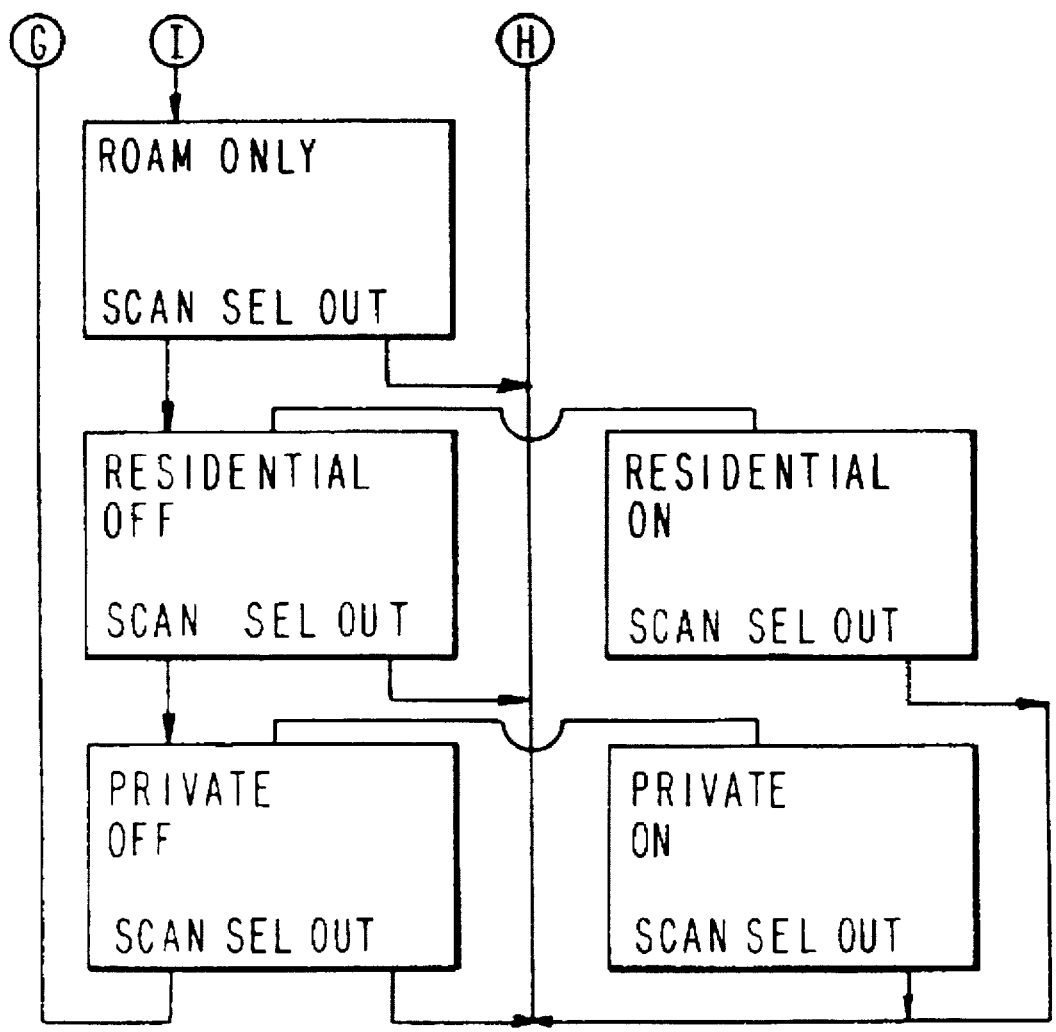
Figure 10F:
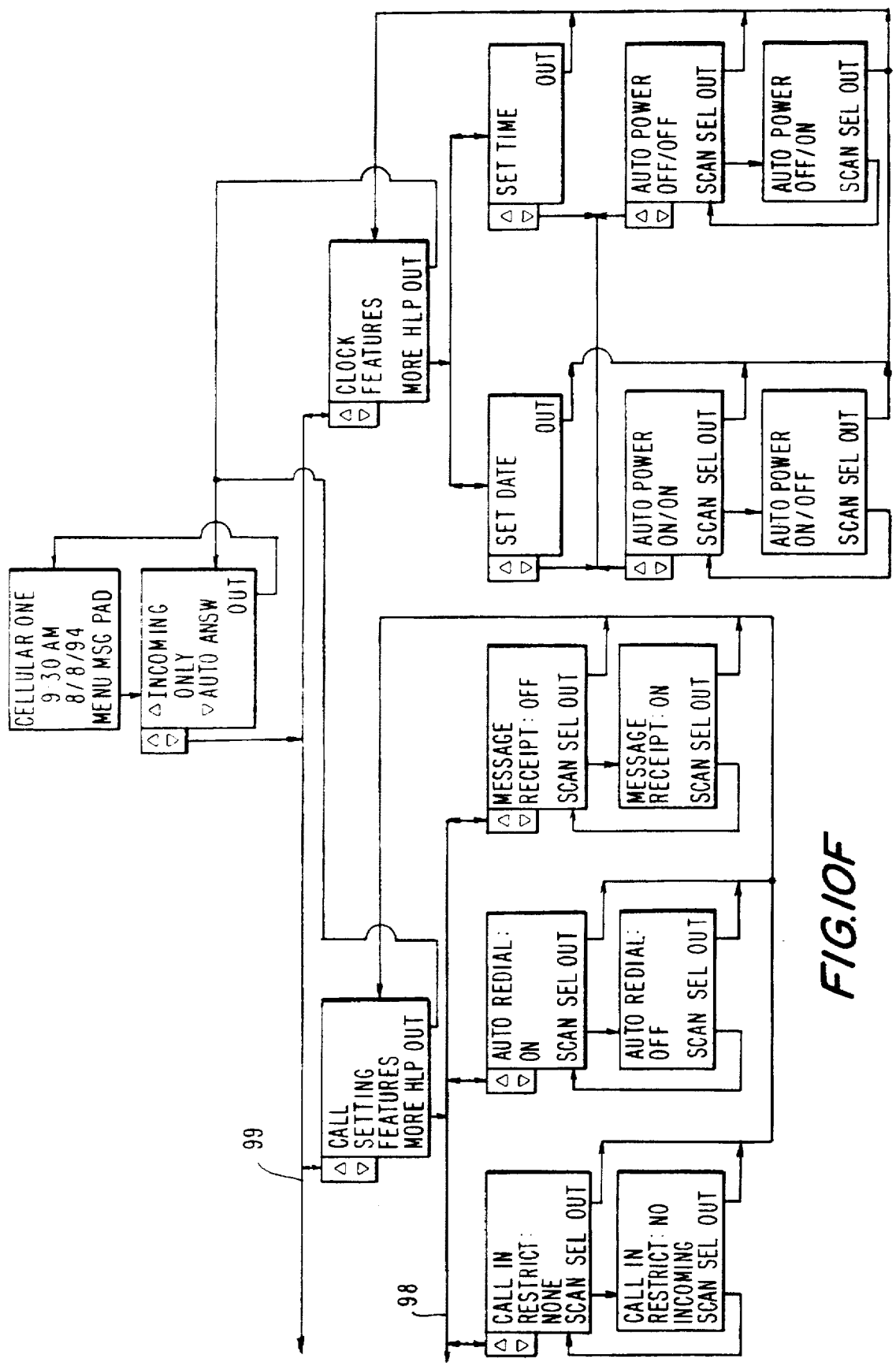

FIGS. 9A and 9B illustrate screens which may be displayed during various operations of the message function while the telephone apparatus 10 is in the stand-by mode and the conversation mode, respectively.

With regard to FIG. 9A, screen S500 illustrates a screen which may be displayed during the stand-by mode. Depressing the msg soft key accesses the message function, whereupon if new or old messages have been received screen S510 may be displayed and if no new or old messages have been received screen S610 may be displayed. Depressing the vm soft key at screen S510 activates the voicemail feature so that such voicemail messages may be reviewed as shown in screen S520. Depressing the out soft key at screen S510 returns the display to the prior stand-by screen as shown in screen S530. The user may scroll through the text messages indicated in screen S510 as shown in screens S540, S550 and S560.

At screen S560, the del soft key may be depressed so as to delete the message as shown in screen S570. By depressing an "undo" soft key at screen S570, such deletion may be undone as shown in screens S580 and S590. Depressing the out soft key at screen S570 returns the display to a prior screen (such as screen S510) as shown in screen S600. In a similar manner, depressing the out soft key at screen S560 returns the display to a prior screen (such as screen S510) as shown in screen S605. Also at screen S560, an "answ" soft key may be depressed, whereupon previously stored answers or responses may be reviewed by scrolling as shown in screens S650 and S660. Upon finding an acceptable response, it is placed on the middle line of lines 62 and an OK soft key is depressed at screen S660, whereupon such response may be sent by depressing the send key 24 as shown in screens S680 and S690. After which, the display may return to a prior screen (such as screen S550) as shown in screen S700. A selected response may be edited by depressing the edit soft key in screen S660 and, when the modified response is acceptable, an OK soft key is depressed as shown in screens S665 and S667. Such modified response may thereafter be transmitted. At screen S660, depressing an out soft key returns the display to a prior screen (such as screen S560) as shown in screen S670.

Returning to screen S610, depressing the vm soft key enables voicemail messages to be reviewed as shown in screen S620. Further, depressing the new soft key at screen S610 enables a new message to be created as shown in screen S640. Furthermore, the display or screen S610 may be returned to the prior stand-by screen by depressing the out soft key as shown in screen S630.

With regard to FIG. 9B, screen S710 illustrates a screen which may be displayed during the conversation mode. Depressing the features soft key may provide screen S720 which indicates available features, that is, the mute feature, the 3-way telephone conversation feature and the message feature or function. The message function may be selected by use of the scroll button 32 and the OK soft key, whereupon an indication of the received messages may be provided as shown in screens S730 and S740. These messages may be reviewed by utilizing the scroll button 32 as shown in screens S750, S760 and S770. Depressing the out soft key may return the display to screen S710. Furthermore, a message may be deleted as indicated at screen S760 (and such deletion may be undone) in a manner similar to that previously described.

The menu function is a list of features which may vary from network features to settings for the telephone apparatus 10. Accessing the menu enables such features to be reviewed or parameters or settings thereof to be changed. The menu may be configured as an arrangement of groups, wherein a user may move from group to group by use of the scroll button 32. Further, such groups may be arranged in a circular fashion such that a user may move from the last group to the first group. Upon entering a group, a user may move between features of that group by utilizing the scroll button 32. Features within a group and parameters or settings of a feature may also be arranged in circular fashion. A particular feature may be reviewed by depressing a "scan" soft key.

In addition to the scroll button 32 and the scan soft key, numerous soft keys may be available in the menu. For example, a "more" soft key may provide access to a specific group within the menu. A "sel" soft key may enable a user to select or change settings/parameters of a feature in the menu. A "help" soft key may provide an explanation of a respective group or features including how they may be used. An "out" soft key may return the user to the stand-by mode.

FIGS. 10A–F illustrate screens which may be displayed during various operations of the book function. Line 99 is a continuous line which represents that the features coupled thereto are arranged in a circular fashion in the manner previously described. In other words, the line 99 is continuous from FIG. 10A to FIG. 10B to FIG. 10D to FIG. 10F. In a similar manner, line 98 extends from FIG. 10D to FIG. 10F. Based upon the above description, the screens illustrated in FIGS. 10A–F and the flow therebetween are believed to be self-explanatory. Accordingly, in the interest of brevity, no further explanation is provided herein.

Therefore, the present invention provides a telephone apparatus which is relatively easy to operate. That is, the present telephone apparatus includes menu, pad, book and message functions which may be directly accessed without having to access another function. Further, the present telephone apparatus provides a plurality of changeable or soft keys which have functions or features associated therewith which may change in accordance with the operation currently being performed by the telephone apparatus. An indication of which of the soft keys is currently available and the current function associated with each available soft key are conveniently displayed. Furthermore, the present telephone apparatus uses readily understandable language in its displays and in identifying its keys. As a result, an operator may readily and easily use the present telephone apparatus without having to constantly refer to an instruction manual or memorize numerous operations.

Furthermore, the present telephone apparatus enables voice and text messages to be received and stored therein for review at a later time. A response to a received message, such as a previously stored response, may be transmitted from the telephone apparatus. Additionally, a previously stored or transmitted response may be modified or a new message may be generated and transmitted from the telephone apparatus.

Although the present telephone apparatus was described as having a specific number of soft keys (such as 3 soft keys) and dedicated keys, the present telephone apparatus is not so limited. Instead, any number of soft and dedicated keys may be utilized.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A portable telephone apparatus having a plurality of selectable functions for enabling a number of types of communication in a wireless manner between an operator and at least one person, said apparatus comprising:

a plurality of dedicated keys each having at least one respective dedicated function associated therewith;

one or more changeable keys each having at least one respective changeable function associated therewith, in which the function of each said changeable key is changeable in response to a selected function;

means for receiving a first message from a first person while said operator is engaged in a telephone conversation with a second person in which said first message is any of a voice message or a text data message and for storing the received first message for subsequent retrieval by said operator;

means for transmitting a second message to said second person; and display means for displaying a plurality of lines of data including the received first message or the transmitted second message.

2. A portable telephone apparatus according to claim 1, wherein said received first message and said transmitted second message include alpha-numeric data.

3. A portable telephone apparatus according to claim 1, wherein said display means displays five lines of said data in which one of said lines displays one or more icons each respectively representing information relating to the telephone apparatus and its operation, three of said lines display informational data, and one of said lines displays an indication of each said changeable key which is currently available.

4. A portable telephone apparatus according to claim 3, wherein each said icon is displayed in an upper line of said display means, said indication of each said changeable key is displayed in a lower line of said display means, and said informational data is displayed in a middle three lines between said upper line and said lower line of said display means.

5. A portable telephone apparatus according to claim 4, wherein said informational data displayed in said middle three lines includes one of said received first message and said transmitted second message.

6. A portable telephone apparatus according to claim 2, wherein said received first message is one of a plurality of types of messages.

7. A portable telephone apparatus according to claim 6, wherein said plurality of types of messages include a voice-data type message and a text-data type message.

8. A portable telephone apparatus according to claim 3, wherein the receiving means receives one or more first messages and wherein each of said first messages is one of a plurality of types of messages and wherein said informational data indicates a quantity of the received first messages and the type of each said received first message.

9. A portable telephone apparatus according to claim 3, wherein said first message invites a response thereto and wherein said apparatus further comprises means for providing said response and for transmitting said response to a desired person.

10. A portable telephone apparatus according to claim 9, wherein said providing means includes means for producing a plurality of predetermined responses and means for selecting an appropriate one of said plurality of predetermined responses.

11. A portable telephone apparatus according to claim 10, wherein said providing means further includes means for revising a selected one of said plurality of predetermined responses.

12. A portable telephone apparatus for enabling a number of types of communication between a user and at least one person, said apparatus comprising:

a plurality of dedicated keys each having at least one respective dedicated function associated therewith;

means for performing a plurality of operational functions including a message function in which a first message which is any of a first text-data message and a first voice message is received from a first person while said user is engaged in a telephone conversation with a second person and in which a second message which is any of a second text data message and a second voice message is transmitted to said second person, a pad function which enables telephone numbers that have been any of dialed by said operator, received by said apparatus, and missed by said operator to be reviewed, a book function which enables names and corresponding telephone numbers to be stored and retrieved from storage, and a menu function which enables available features of said telephone apparatus to be reviewed and parameters thereof changed;

one or more changeable keys each having at least one respective changeable function associated therewith, in which the function of each said changeable key is changed in response to the operational function currently being performed; and display means for displaying a plurality of lines of digital data representing the received first message or the transmitted second message.

13. A portable telephone apparatus according to claim 12, wherein said display means displays five lines of said data in which one of said lines displays one or more icons each respectively representing information relating to the telephone apparatus and its operation, three of said lines display informational data including said received first message and said transmitted second message, and one of said lines displays an indication of each said changeable key which is currently available.

14. A portable telephone apparatus according to claim 13, wherein each said icon is displayed in an upper line of said display means, said indication of each said changeable key is displayed in a lower line of said display means, and said informational data is displayed in a middle three lines between said upper line and said lower line of said display means.

15. A portable telephone apparatus according to claim 14, wherein said received first message invites a response thereto and wherein said apparatus further comprises means for providing said response and for transmitting said response to a desired person.

16. A portable telephone apparatus according to claim 15, wherein said providing means includes means for producing a plurality of predetermined responses and means for selecting an appropriate one of said plurality of predetermined responses.

17. A portable telephone apparatus according to claim 16, wherein said providing means further includes means for revising a selected one of said plurality of predetermined responses.

18. A telephone apparatus for communicating between an operator and a plurality of people, said apparatus comprising:

a plurality of dedicated keys each having at least one respective dedicated function associated therewith;

a plurality of changeable keys each having at least one respective changeable function associated therewith, in which the function of at least one of said changeable keys is changeable to another function when said operator receives information from one person while said operator is communicating with another person; and display means for displaying the current function associated with each of said changeable keys.

19. A telephone apparatus comprising:

a plurality of keys;

means for performing a plurality of main functions including a menu function wherein available features of said telephone apparatus are reviewed and parameters thereof changed, a message function in which messages are received and transmitted from and to one or more persons, a pad function which enables telephone numbers that have been any of dialed by an operator, received by said telephone apparatus, and missed by said operator are reviewed, and a book function which enables names and corresponding telephone numbers to be stored and retrieved from storage; and means for directly accessing each of said menu function, said message function, said pad function, and said book function by depressing only a respective one of said keys after power has been applied to said telephone apparatus.

20. A telephone apparatus according to claim 19, wherein said plurality of keys includes a plurality of changeable keys each having at least one respective dedicated function associated therewith.

21. A telephone apparatus according to claim 20, further comprising display means for displaying a plurality of lines of data.

22. A telephone apparatus according to claim 21, wherein said display means displays five lines of said data in which one of said lines displays one or more icons each respectively representing information relating to the telephone apparatus and its operation, three of said lines display informational data including information pertaining to the received or transmitted messages, and one of said lines displays an indication of each said changeable key which is currently available.

23. A telephone apparatus according to claim 22, wherein each said icon is displayed in an upper line of said display means, said indication of each said changeable key is displayed in a lower line of said display means, and said informational data is displayed in a middle three lines between said upper line and said lower line of said display means.

24. A telephone apparatus according to claim 23, wherein a received message invites a response thereto and wherein said apparatus further comprises means for providing said response and for transmitting said response to a desired person.

25. A telephone apparatus according to claim 24, wherein said providing means includes means for producing a plurality of predetermined responses and means for selecting an appropriate one of said plurality of predetermined responses.

26. A telephone apparatus according to claim 25, wherein said providing means further includes means for revising a selected one of said plurality of predetermined responses.

* * * * *

US005737394C1

(12) EX PARTE REEXAMINATION CERTIFICATE (8859th)

United States Patent
Anderson et al.

(10) Number: US 5,737,394 C1
(45) Certificate Issued: Feb. 21, 2012

(54) PORTABLE TELEPHONE APPARATUS HAVING A PLURALITY OF SELECTABLE FUNCTIONS ACTIVATED BY THE USE OF DEDICATED AND/OR SOFT KEY

(75) Inventors: Geoffrey T. Anderson, San Diego, CA (US); Sophie Klym, Lincoln Park, NJ (US); Andrew Todd Zidel, Hawthorne, NJ (US); Masaaki Akahane, Mahwah, NJ (US); Eduardo Sciammarella, Hoboken, NJ (US)

(73) Assignee: Mobilemedia Ideas LLC, Chevy Chase, MD (US)

Reexamination Request:
No. 90/009,942, Aug. 17, 2011

Reexamination Certificate for:
Patent No.: 5,737,394
Issued: Apr. 7, 1998
Appl. No.: 08/597,292
Filed: Feb. 6, 1996

(51) Int. Cl.
*H04M 1/72* (2006.01)
*H04M 1/274* (2006.01)
*H04M 1/247* (2006.01)
*H04M 11/06* (2006.01)
*H04M 1/2745* (2006.01)
*H04M 1/725* (2006.01)

(52) U.S. Cl. .................. 379/88.11; 379/93.17; 379/354; 379/396; 455/412.1; 455/413

(58) Field of Classification Search .................. None
See application file for complete search history.

(56) References Cited

To view the complete listing of prior art documents cited during the proceeding for Reexamination Control Number 90/009,942, please refer to the USPTO's public Patent Application Information Retrieval (PAIR) system under the Display References tab.

*Primary Examiner* — Roland Foster

(57) ABSTRACT

A telephone apparatus having a plurality of dedicated keys, a plurality of changeable keys each having at least one respective dedicated function associated therewith, and a display for displaying a plurality of lines of data. The telephone apparatus is adapted to perform a plurality of main functions including so-called menu, message, pad and book functions. Each of such main functions may be directly accessed by depressing only one of the keys. Further, the telephone apparatus enables messages, including voicemail and text data messages, to be received and stored therein. Messages or responses to received messages may be produced and transmitted from the telephone apparatus.

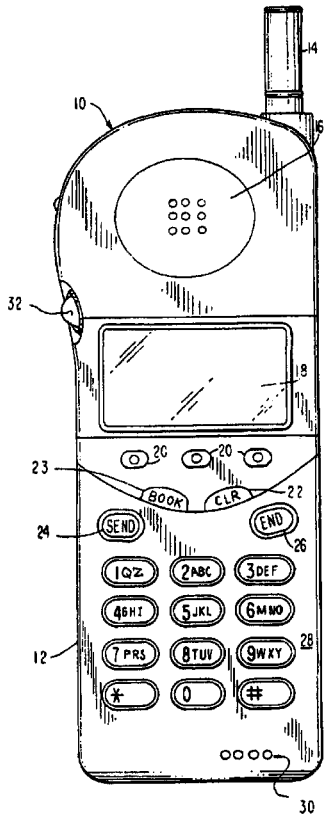

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 19 is confirmed.

New claims 27-41 are added and determined to be patentable.

Claims 1-18 and 20-26 were not reexamined.

*27. A telephone apparatus according to claim 19, further comprising a display configured to display a screen including plurality of lines of data, wherein said screen includes an icon at a top line of said plurality of lines.*

*28. A telephone apparatus according to claim 27, wherein said icon is one of a signal strength icon, a battery level icon and a roam icon.*

*29. A telephone apparatus according to claim 19, further comprising a display configured to display a screen including plurality of lines of data, wherein said screen includes a plurality of icons at a top line of said plurality of lines.*

*30. A telephone apparatus according to claim 29, wherein each of said plurality of icons is one of a signal strength icon, a battery level icon and a roam icon.*

*31. A telephone apparatus according to claim 19, further comprising a display configured to display a screen including a message icon representing said message function, said message icon having a first portion, wherein said screen further includes an indication, displayed in relation to said first portion after a new message has been received, that said new message has been received.*

*32. A telephone apparatus according to claim 31, wherein said indication indicates that said new message is a text message.*

*33. A telephone apparatus according to claim 31, wherein said indication indicates a number of new messages that have been received.*

*34. A telephone apparatus according to claim 19, wherein, in said book function, an entry comprises a name and a corresponding telephone number, and wherein access to said entry is restrictable.*

*35. A telephone apparatus according to claim 34, wherein when access to said entry is restricted, a password is required for access to said entry.*

*36. A telephone apparatus according to claim 19, wherein, in said book function, an entry comprises a name and a corresponding telephone number, and wherein access to said entry is lockable.*

*37. A telephone apparatus according to claim 36, wherein when access to said entry is locked, a password is required for access to said entry.*

*38. A telephone apparatus according to claim 19, wherein said pad function includes an automatic dumping feature wherein an oldest dialed telephone number is dumped when a new dialed telephone number is stored in memory.*

*39. A telephone apparatus according to claim 19, wherein said means for performing further includes an editing operation on information stored in memory.*

*40. A telephone apparatus according to claim 19, wherein said telephone apparatus is a portable telephone apparatus.*

*41. A telephone apparatus according to claim 19, wherein said telephone is a cellular telephone apparatus.*

\* \* \* \* \*